United States Patent
Nagai et al.

(10) Patent No.: US 8,502,941 B2
(45) Date of Patent: Aug. 6, 2013

(54) TRANSFLECTIVE LIQUID-CRYSTAL-DISPLAY DEVICE WITH SINGLE RETARDATION FILM BETWEEN HALF-WAVEPLATE AND LIQUID CRYSTAL LAYER

(75) Inventors: Hiroshi Nagai, Kanagawa (JP); Michiaki Sakamoto, Kanagawa (JP); Kenichi Mori, Kanagawa (JP); Kenichirou Naka, Kanagawa (JP); Hidenori Ikeno, Kanagawa (JP)

(73) Assignee: NLT Technologies, Ltd. (JP)

( * ) Notice: Subject to any disclaimer, the term of this patent is extended or adjusted under 35 U.S.C. 154(b) by 197 days.

(21) Appl. No.: 12/873,108

(22) Filed: Aug. 31, 2010

(65) Prior Publication Data
US 2010/0328592 A1 Dec. 30, 2010

Related U.S. Application Data

(62) Division of application No. 11/682,646, filed on Mar. 6, 2007, now Pat. No. 7,864,274.

(30) Foreign Application Priority Data

Mar. 7, 2006 (JP) .................................. 2006-061383

(51) Int. Cl.
*G02F 1/1335* (2006.01)
(52) U.S. Cl.
USPC ........... 349/119; 349/117; 349/118; 349/120; 349/121; 349/114
(58) Field of Classification Search
USPC .......................... 349/114, 141–143, 117–121
See application file for complete search history.

(56) References Cited

U.S. PATENT DOCUMENTS

| | | | |
|---|---|---|---|
| 6,341,002 B1 * | 1/2002 | Shimizu et al. | 349/119 |
| 6,914,656 B2 | 7/2005 | Sakamoto et al. | 349/141 |
| 7,119,868 B2 | 10/2006 | Ootake | 349/119 |
| 7,420,635 B2 | 9/2008 | Ozawa | 349/114 |
| 7,477,347 B2 * | 1/2009 | Matsushima et al. | 349/114 |
| 7,502,084 B2 * | 3/2009 | Nishimura | 349/114 |
| 2005/0264731 A1 | 12/2005 | Itou et al. | 349/114 |
| 2006/0256264 A1 | 11/2006 | Yang et al. | 349/114 |
| 2007/0002226 A1 | 1/2007 | Sakamoto et al. | 349/114 |
| 2009/0066896 A1 | 3/2009 | Kawashima et al. | 349/114 |

FOREIGN PATENT DOCUMENTS

| | | |
|---|---|---|
| CN | 1474216 | 2/2004 |
| JP | 2003-344837 | 12/2003 |
| JP | 2006039369 | 2/2006 |

OTHER PUBLICATIONS

Chinese Official Action dated Apr. 20, 2009.
Tishinabe, et al., "Optical Design of Wide Viewing Angle Retardation Film and Polarizer with high Achromaticity", Tohoku University, Department of Electronics, Graduate School of Engineering, 2001, pp. 55-61.
Japanese Office Action issued in Application No. 2006-061383 dated Jul. 5, 2011 (5 pages).

* cited by examiner

*Primary Examiner* — Hoan C Nguyen
(74) *Attorney, Agent, or Firm* — Hayes Soloway P.C.

(57) ABSTRACT

A LCD device has a LC layer sandwiched between a TFT substrate and a counter substrate, first and second polarizing films, a first $\lambda/2$ film between the first polarizing film and the counter substrate, and a second $\lambda/2$ film between the second polarizing film and the TFT substrate. Angle $\theta 1$ between the direction of the optical axis of the LC layer and the polarized direction of the light entering the LC layer satisfies the relationship: 0 degree$<\theta 1<$45 degrees. The resultant LCD device has lower leakage light and coloring.

3 Claims, 25 Drawing Sheets

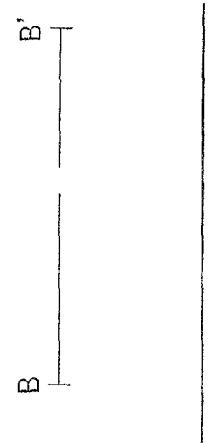
FIG. 10C
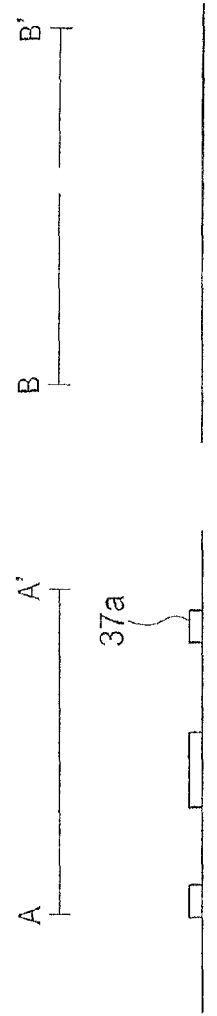
FIG. 10B
FIG. 10D
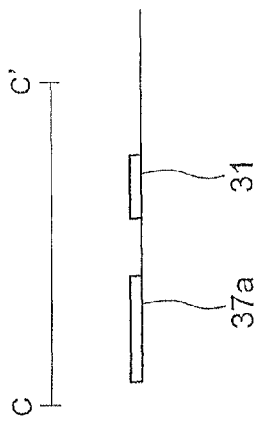
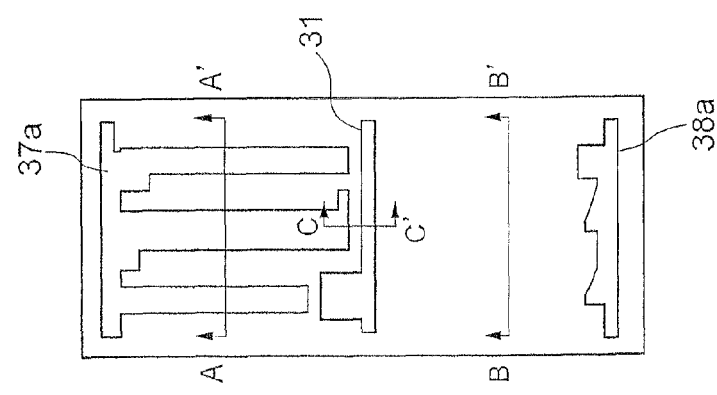
FIG. 10A

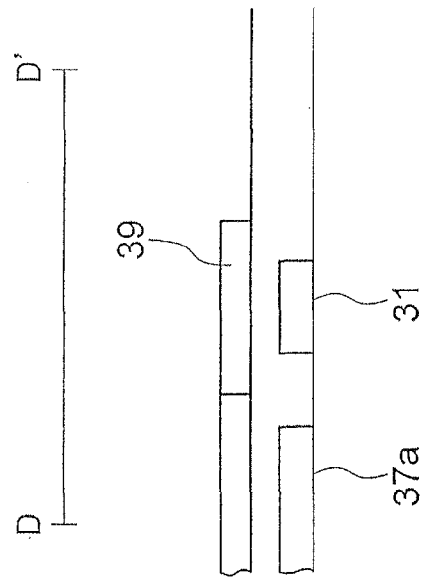
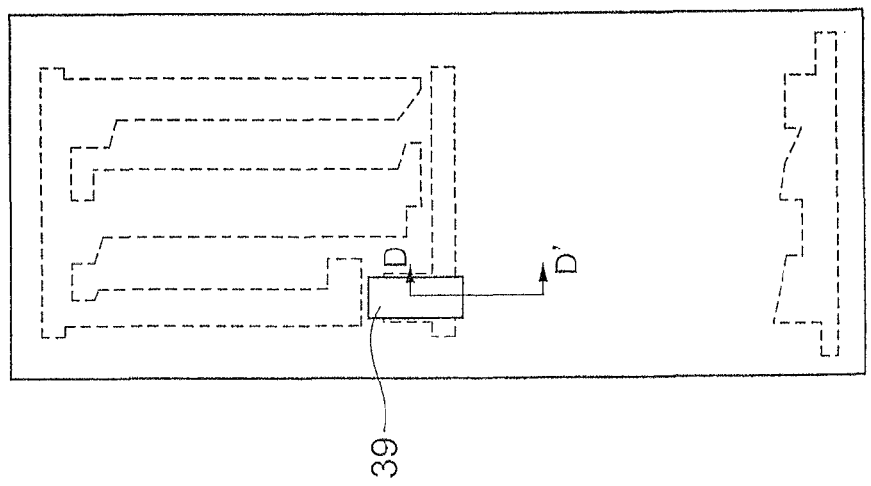

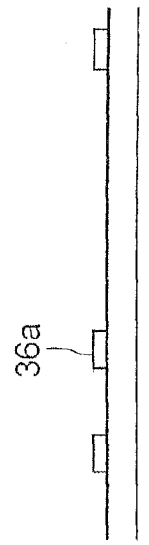
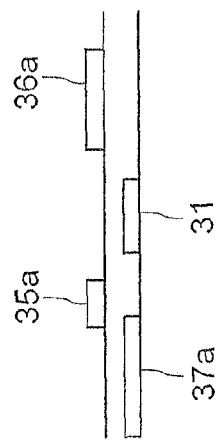
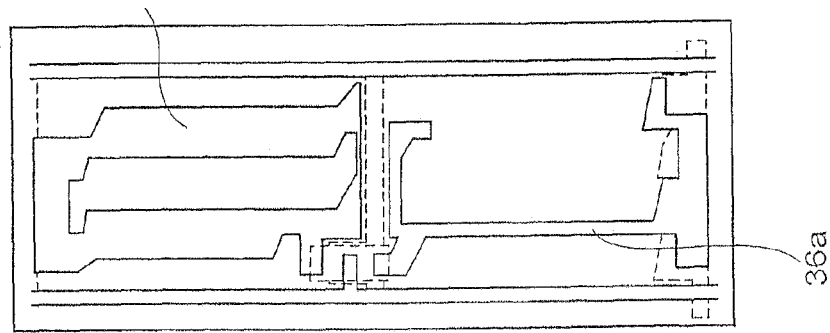
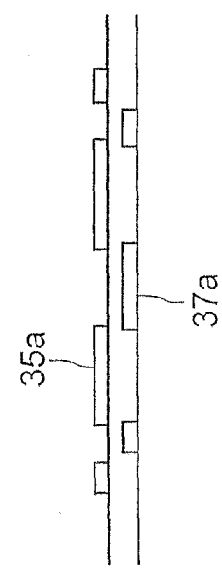

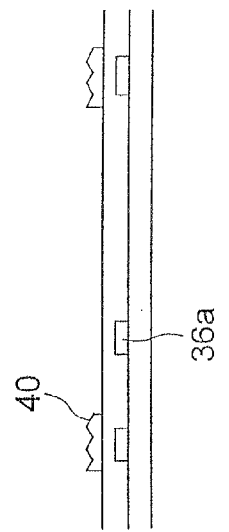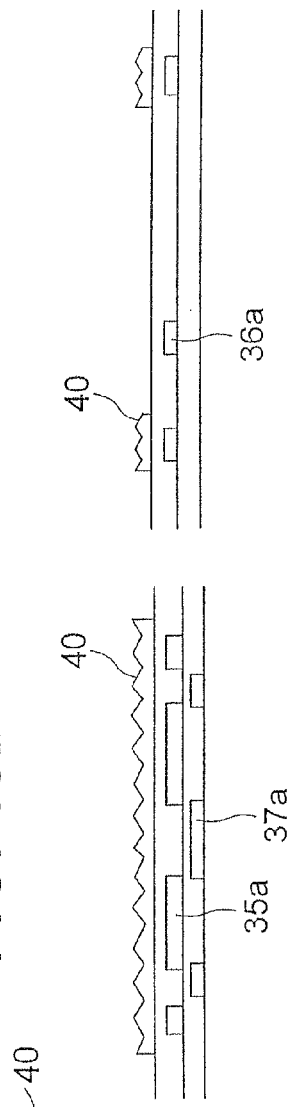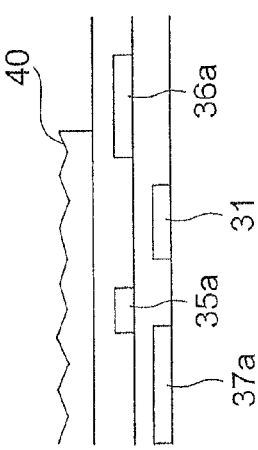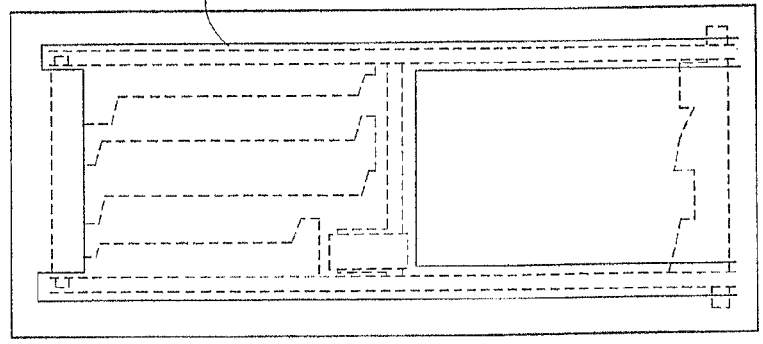

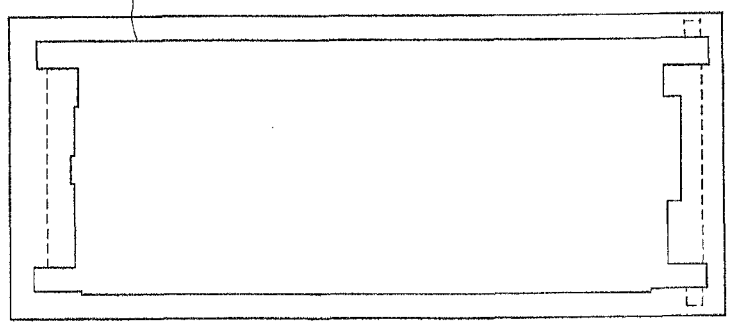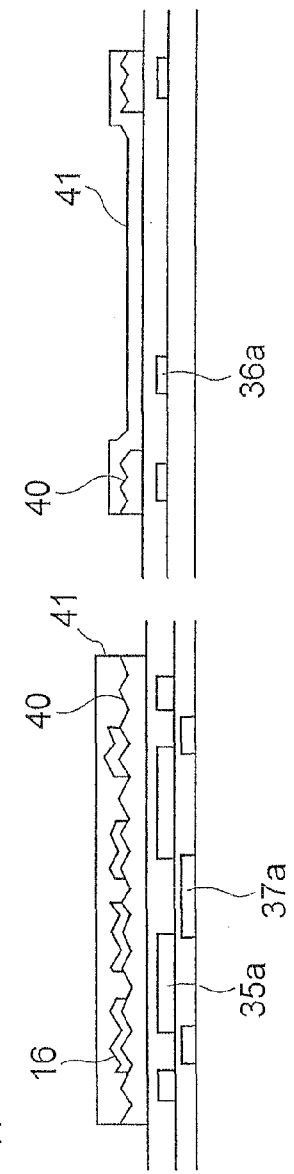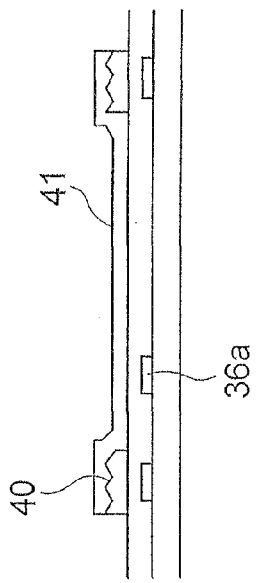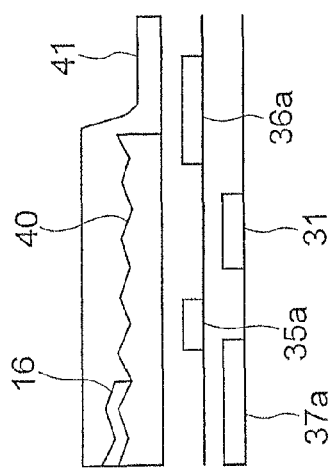

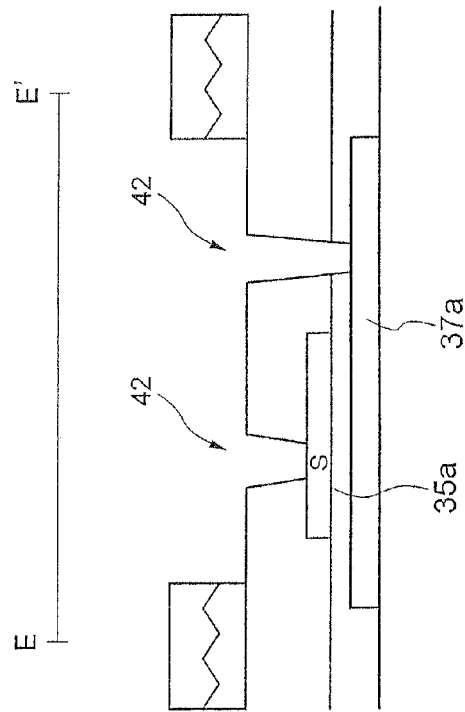
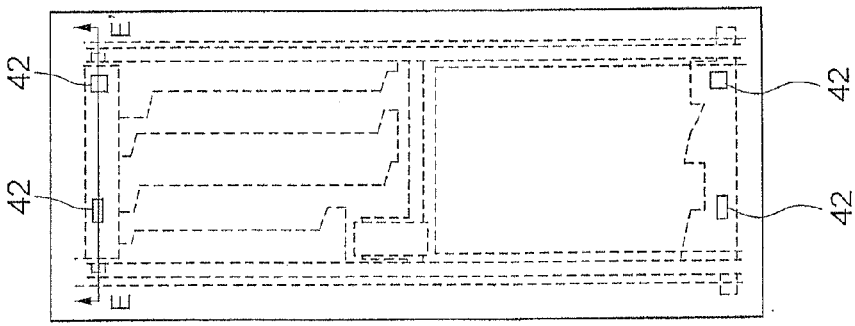

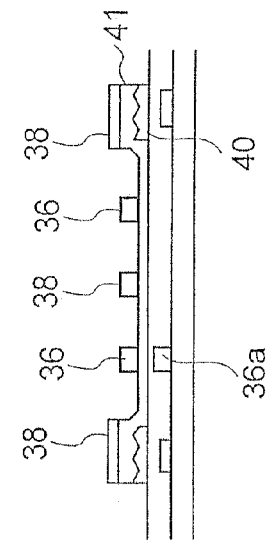
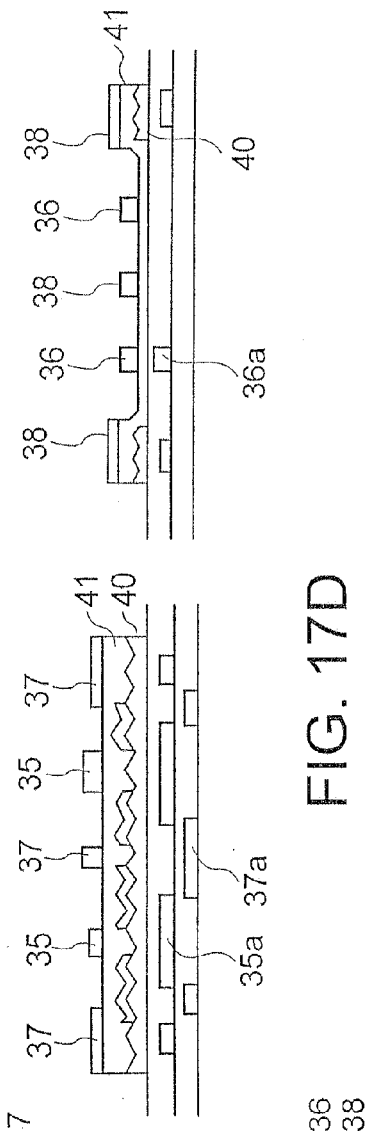
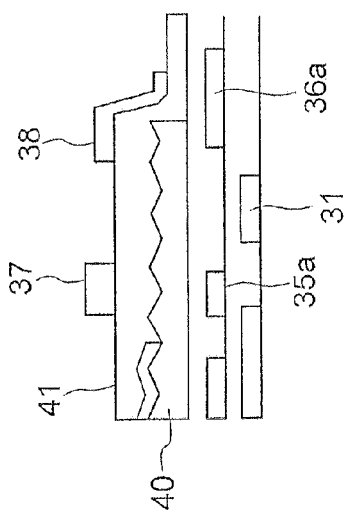
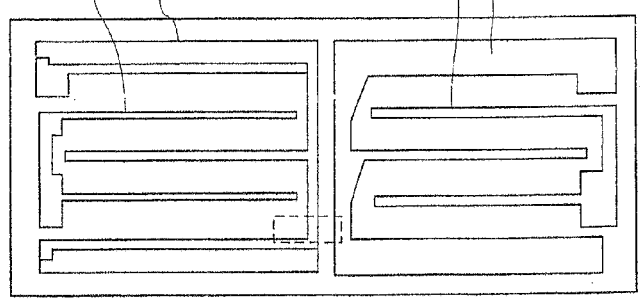
FIG. 17A
FIG. 17B
FIG. 17C
FIG. 17D

FIG. 19

|  | Nz≦0.3 | Nz≦1.0 |
|---|---|---|
| POLARIZING FILM 11 | 15 | 15 |
| λ/2 WAVELENGTH FILE 18 | 97.5 | 97.5 |
| LC LAYER 13 | 90 | 90 |
| RETARDATION FILM 20 | 90.0 | 90.0 |
| λ/2 WAVELENGTH FILE 19 | 82.5 | 82.5 |
| POLARIZING FILM 15 | 75 | 75 |

TRANSFLECTIVE LIQUID-CRYSTAL-DISPLAY DEVICE WITH SINGLE RETARDATION FILM BETWEEN HALF-WAVEPLATE AND LIQUID CRYSTAL LAYER

CROSS REFERENCE TO RELATED APPLICATION

This application is a divisional of U.S. application Ser. No. 11/682,646, filed Mar. 6, 2007, now U.S. Pat. No. 7,864,274, the contents of which are incorporated herein by reference.

BACKGROUND OF THE INVENTION

1. Field of the Invention

The present invention relates to a transflective liquid-crystal-display (LCD) device and, more particularly, to a transflective LCD device having a transmissive area and a reflective area in each pixel of the LCD device.

2. Description of the Related Art

LCD devices are roughly categorized into two types including a transmissive LCD device and a reflective LCD device. In general, the transmissive LCD device has a backlight unit and controls the transmission amount of light from the backlight unit to thereby represent an image on the screen. The reflective LCD device has a reflection film that reflects light incident from the outside and uses the light reflected by the reflection film as a light source to represent an image. That is, the reflective LCD device does not require the backlight unit, and is more advantageous than the transmissive LCD device in terms of a reduction in power dissipation, thickness, and weight. However, since the reflective LCD device uses the background light as the light source, visibility of the image is degraded if the background of the LCD device is dark.

As a LCD device having both advantages of the reflective LCD device and transmissive LCD device, a transflective LCD device is known (refer to, e.g., JP-2003-344837A, FIGS. 4 and 20, columns 0009 to 0019, columns 0045 to 0048). The transflective LCD device has a transmissive area and a reflective area in each pixel of the LCD device. The transmissive area transmits the light emitted from a backlight unit and uses the backlight unit as a light source for representing the image. The reflective area has a reflection film and uses the light incident thereto from the outside and reflected by the reflection film as the light source. In the transflective LCD device, if the background of the LCD device is light, the image is represented on the screen by using the reflective area, with the backlight unit being turned off, to thereby achieve a reduction in power dissipation. On the other hand, if the background of the LCD device is dark, the backlight unit is turned on to represent the image by using the transmissive area, thereby enabling the image to be represented on the screen even in a dark background.

A lateral electric-field LCD device such as an in-plane-switching mode (IPS mode) is known as a display mode of the LCD device. The LCD device has a pixel electrode and a common electrode formed in each pixel on the common substrate, and these electrodes apply therebetween a lateral electric field to a liquid crystal (LC) layer. The IPS-mode LCD device rotates the LC molecules in the LCD layer in the direction parallel to the surface of the substrate so as to represent the image, thereby achieving a wirier viewing angle than a twisted-nematie(TN)-mode LCD device.

If the IPS mode is adopted in the transflective LCD device, a problem arises in that the black image and the white image are inverted between both the areas, as described in the technique of the above patent publication. More specifically, if the transmissive area is set at a normally-black mode, the reflective area will have a normally-white mode. The problem of the image inversion will be described hereinafter for a better understanding of the present invention.

FIG. 22A schematically shows the sectional view of the transflective LCD device, wherein a double-sided arrow shows the direction of polarization axis of the polarizing film as viewed parallel to the substrate. FIG. 22B shows the polarized direction of light in both the reflective and transmissive areas 55 and 56 for the structure of FIG. 22A, upon emission of the light at the first polarizing film 51, LC layer 53 and second polarizing film 52. In FIG. 22B, the double-sided arrow depicts the linearly-polarized light, a thick arrow represents the traveling direction of the light, a circled "R" denotes a clockwise-circularly-polarized light, a circled "L" denotes a counterclockwise-circularly-polarized light, and a hollow bar denotes the direction of LC director (molecules). FIG. 22A shows the state of a single pixel including the reflective area 55 and the transmissive area 56. The reflective area 55 uses the reflected light from a reflection film 54 as a light source, and tie transmissive area 56 uses the backlight unit as a light source.

The polarizing film (first polarizing film) 51 on the light emitting side is a common polarizing film effecting on both the reflective and transmissive areas 55 and 56, whereas the polarizing film (second polarizing film) 52 is a dedicated polarizing film effecting on the light incident side of the transmissive area 56. These polarizing films 51 and 52 are arranged such that the polarizing axes thereof cross at right angles.

In the LC layer 53, LC molecules are arranged such that the molecular direction upon absence of applied voltage is shifted by 90 degrees relative to direction of the polarization axis (optical transmission axis) of the second polarizing film 52. Assuming that the direction of the polarization axis of the second polarizing film 52 shown in FIG. 22A is the reference direction, or at 0 degree, the direction of the polarization axis of the first polarizing film 51 is set at 90 degrees and the initial direction of the longitudinal axis of LC molecules in the LC layer 53 is set at 90 degrees, as shown in FIG. 22A.

In the transmissive area of the LC layer 53, the cell gap of the LC layer 53 is adjusted such that the retardation $\Delta nd$ ($\Delta n$ is the refractive index anisotropy of LC molecules and "d" is the cell gap) assumes $\lambda/2$ ($\lambda$ is the wavelength of light; for example, in the case of green light, $\lambda$ is 550 nm) and in the reflective area 55 of the LC layer 53, the cell gap is adjusted such that the retardation assumes $\lambda/4$. The image represented on the screen of the LCD device will be described hereinafter in the case of absence and presence of applied voltage for the respective areas 55 and 56.

<Reflective Area Upon Absence of Applied Voltage>

The image in the reflective area 55 upon absence of applied voltage (Voff) on the LC layer 53 will be described first with reference to the leftmost column of FIG. 22B. In the reflective area 55, 90-degree linearly-polarized light passing through the first polarizing film 51 enters the LC layer 53. The direction of the optical axis of the linearly -polarized light that has entered the LC layer 53 and direction of the longitudinal axis of LC molecules are aligned in this case, whereby the 90-degree linearly-polarized light is passed through the LC layer 53 without a change in the polarization and is reflected by the reflection film 54. Thus, the 90-degree linearly-polarized light enters the LC layer 53 once again without a change. The 90-degree linearly-polarized light is thus emitted through the LC layer 53 and enters the first polarizing film 51. Since the direction of the polarization axis of the first polarizing film 51 is set at 90 degrees, the linearly-polarized light is passed through the first polarizing film 51. As a result, a bright image (white image) is represented upon Voff of the LCD device.

<Reflective Area Upon Presence of Applied Voltage>

Next, the state in the reflective area 55 upon presence of applied voltage on the LC layer 53 will be described with reference to the second leftmost column in FIG. 22B. A 90-degree linearly-polarized light passing through the first polarizing film 51 enters the LC layer 53. Here, the applied voltage causes the direction of the longitudinal axis of LC molecules in the LC layer 53 to be changed from 0 degree to 45 degrees with respect to the surface of the substrate. Since the polarized direction of the light that has entered the LC layer 53 is deviated by 45 degrees from the direction of the longitudinal axis of LC molecules and the retardation of the liquid crystal is set at $\lambda/4$, the 90-degree linearly-polarized light that has entered the LC layer 53 assumes a clockwise-circularly-polarized light, which enters the reflection film 54. The clockwise-circularly-polarized light is reflected by the reflection film to be changed into a counterclockwise-circularly-polarized state. The counterclockwise-circularly-polarized light that has entered the LC layer 53 passes therethrough once again to be changed into a horizontal (0-degree) linearly-polarized light. The horizontal-linearly-polarized light then enters the first polarizing film 51. Since the direction of the polarization axis of the first polarizing film 51 is at 90 degrees, the light reflected by the reflection film 54 cannot be passed through the first polarizing film 51, with the result that a dark image (black) is represented on the screen.

As described above, the reflective area 55 assumes a normally white mode in which a bright image (white) is represented upon absence of applied voltage (Voff) and a dark image (black) is represented upon presence of applied voltage (Von).

<Transmissive Area Upon Absence of Applied Voltage>

Next, the state in the transmissive area 56 upon absence of applied voltage on the LC layer 53 will be described with reference to the second rightmost column in FIG. 22B. In the transmissive area 56, a horizontal-linearly-polarized light passing through the second polarizing film 52 enters the LC layer 53. The polarized direction of the incident light and longitudinal direction of LC molecules cross each other at right angles, whereby the horizontal-linearly-polarized light is passed through the LC layer 53 without a change in the polarization and enters the first polarizing film 51. Since the direction of the polarization axis of the first polarizing film 51 is at 90 degrees, the transmitted light cannot be passed through the first polarizing film 51, resulting in display of a dark image on the screen.

<Transmissive Area Upon Presence of Applied Voltage>

Next, the state in the transmissive area 56 upon presence of applied voltage on the LC layer 53 will be described with reference to the rightmost column in FIG. 22B. In the transmissive area 56, a horizontal-linearly-polarized light passing through the second polarizing film 52 enters the LC layer 53. Here, the applied voltage causes the direction of the longitudinal axis of LC molecules in the LC layer 53 to be changed from zero degree to 45 degrees with respect to the surface of the substrate. Thus, the polarized direction of the light that has entered the LC layer 53 is shifted to 45 degrees with respect to the direction of the longitudinal axis of LC molecules. Since the retardation of the LC layer is set at $\lambda/2$, the horizontal-linearly-polarized light that has entered the LC layer 53 is changed into a vertical-linearly-polarized light and enters the first polarizing film 51. As a result, in the transmissive area 56, the first polarizing film 51 passes the backlight transmitted thereto through the second polarizing film 52, resulting in representing a bright image on the screen.

As described above, the transmissive area 56 assumes a normally black mode in which a dark image is represented upon absence of applied voltage (Voff) and a bright image is represented upon presence of applied voltage (Von).

In the above configuration, the transflective LCD device has a disadvantage in that a dark image and a bright image are inverted between the reflective area 55 and the transmissive area 56 upon both the presence and absence of the applied voltage on the LC layer 53. A technique to solve this disadvantage is described in the above patent publication. FIG. 23 shows a sectional view of the LCD device described in the patent publication. In this technique, the direction of the polarization axis of the first polarizing film 51 is shifted by 45 degrees from the direction of the longitudinal axis of LC molecules in the LC layer 53. The mere arrangement of the polarization axis of the first polarizing film 51 and the longitudinal axis of LC molecules in the LC layer 53 will cause the reflective area 55 using the reflection film 54 as the light source to assume a normally black mode and cause the transmissive area 56 using the backlight unit 57 as the light source to assume a normally white anode. In addition thereto, a $\lambda/2$ film 58 is inserted between the second polarizing film 52 and the LC layer 53 to thereby change the transmissive area 56 into a normally black mode, which accords the normally black mode of the reflective area 55.

The direction of the optical axis of the $\lambda/2$ film 58 that crosses the direction of the longitudinal axis of the LC layer 53 at right angles is set at 135 degrees. Thus, in front view of the LCD device, optical compensation is achieved wherein the polarization effect that the LC layer 53 having a retardation of $\lambda/2$ exerts on the light compensates the polarization effect of the $\lambda/2$ film. The optical compensation achieves that the polarized state of light is not changed between the incidence and emission thereof, in consideration of the polarization of light effected by the LC layer 53 and $\lambda/2$ film 58 as a whole. Therefore, the light passing through the second polarizing film 52 to assume the horizontal-linear-polarized light is passed through the LC layer 53 and $\lambda/2$ film 58 without a change in the polarization and cannot be passed through the first polarizing film 51 having an optical axis set at the vertical direction. That is, the insertion of the $\lambda/2$ film 58 between the LC layer 53 and the second polarizing film 52 causes the transmissive area 56 to assume also a normally black mode.

However, in the LCD device 50a shown in FIG. 23, the polarized direction of the light that enters the LC layer 53 and direction of the longitudinal axis of the LC molecules in the LC layer 53 are not parallel or perpendicular to each other in the transmissive area 56. This leads to a disadvantage in that leakage light cannot be suppressed sufficiently, upon display of a dark image, in the transmissive area 56 due to wavelength dispersion characteristics of retardation in the LC layer 53. Further, the $\lambda/2$ film 58 also has wavelength dispersion characteristics, thereby causing leakage light due to the wavelength dispersion upon display of a dark image.

In order for solving the above problem, a configuration may be also considered wherein absence of applied voltage in the transmissive area 56 is achieved upon presence of applied voltage in the reflective area by inverting the voltage applied to the transmissive area to thereby apply the inverted voltage to the reflective area. However, such a device scheme or drive technique that can realize this configuration is not known in the art. In addition, problems encountered by this configuration as well as the countermeasures for solving the problems are not known in the art.

Next, in an IPS-mode transflective LCD device, a configuration will be considered in which a first polarizing film, a first λ/2 film, a first λ/4 film, a first LC-layer compensation film (positive or negative λ/4 film), an LC layer, a second LC-layer compensation film (positive or negative λ/4 film), a second λ/4 film, a second λ/2 film, and a second polarizing film are consecutively layered one on another from the light emitting side. In this configuration, each of the first polarizing film, λ/2 film, λ/4 film and second polarizing film, λ/2 film, λ/4 film are so arranged as a broadband λ/4 film.

If the first and second LC-layer compensation films each are a positive λ/4 film, these films are arranged such that the optical axes thereof cross the direction of the longitudinal axis of LC molecules at right angles. On the other hand, if the first and second LC-layer compensation films each are a negative λ/4 film, these films are arranged such that the optical axes thereof axe parallel to the direction of the longitudinal axis of LC molecules. As a result, the LC layer is configured as a λ/2 film.

Accordingly, the effective retardation Δnd of the first and second LC-layer compensation films and LC layer in total assumes 0 in the state of initial orientation of the LC molecules, thereby providing a dark image in a normally black mode in both the transmissive area and reflective area. However, in this configuration, it is impossible to completely perform phase compensation of the polarized light if the birefringence wavelength dispersion differs between the LC-layer compensation film and the LC layer. Further, it is difficult to perform a gap control for the LC layer. As a result, leakage light and/or coloring (chromaticity shift) occurs during display of a dark image. Therefore, the birefringence wavelength dispersion of a material used for the compensation layer and wavelength dispersion of the LC layer need to correspond to each other. Thus, there remains the problem that cannot be solved only by the device configuration.

SUMMARY OF THE INVENTION

It is an object of the present invention to provide a transflective LCD device capable of reducing coloring or leakage light, upon display of a dark image, due to wavelength dispersion of the LC layer.

It is another object of the present invention to provide a transflective LCD device capable of eliminating the problems related to inversion of bright and dark image between in the transmissive area and in the reflective area, without requiring a complicated structure in order for processing data signals in the LCD device.

The present invention provides a transflective liquid-crystal-display (LCD) device including: a liquid crystal (LC) layer defining a plurality of pixels each having a transmissive area and a reflective area; first and second polarizing films sandwiching therebetween the LC layer, the first polarizing film being effective common to the transmissive area and the reflective area, the second polarizing film being effective to the transmissive area; and a retardation film sandwiched between the first polarizing film and the LC layer.

In accordance with the LCD device of the present invention, the retardation film provided between the first polarizing film and the LC layer compensates the wavelength dispersion of the LC layer upon display of a dark image, thereby suppressing the coloring and/or leakage light of the LCD device. The retardation film may acts as a ½-wavelength film (or λ/2 film) at a wavelength of 550 nm.

The above and other objects, features and advantages of the present invention will be more apparent from the following description, referring to the accompanying drawings.

BRIEF DESCRIPTION OF THE DRAWINGS

FIGS. 10A to 10D show a fabrication step of process for manufacturing the TFT substrate, wherein FIG. 10A depicts a top plan view thereof, and FIGS. 10B to 10D depict sectional views taken along respective lines shown in FIG. 10A;

FIGS. 11A and 11B show a fabrication step subsequent to the step of FIGS. 10A to 10D, wherein FIG. 10A depicts a top plan view thereof, and FIG. 11B depicts a sectional view taken along line D-D' in FIG. 11B.

FIGS. 12A to 12D show a fabrication step subsequent to the step of FIGS. 11A and 11B, wherein FIG. 12A is a top plan view thereof, and FIGS. 10B to 10D depict sectional views taken along respective lines shown in FIG. 12A;

FIG. 13A to 13D show a fabrication step subsequent to the step of FIGS. 12A to 12D, wherein FIG. 13A is a top plan view thereof, and FIGS, 13B to 130 depict sectional views taken along respective lines shown in FIG. 13A;

FIGS. 14A to 14D show a fabrication step subsequent to the step of FIGS. 13A to 13D, wherein FIG. 14A is a top plan view thereof, and FIGS. 14B to 14D depict sectional views taken along respective lines shown in FIG. 14A;

FIGS. 15A to 15D show a fabrication step subsequent to the step of FIGS. 14A to 14D, wherein FIG. 15A is a top plan view thereof, and FIGS. 15B to 15D depict sectional views taken along respective lines shown in FIG. 15A;

FIGS. 16A and 16B show a fabrication step subsequent to the step of FIGS. 15A to 15D, wherein FIG. 16A is a top plan view thereof, and FIG. 16B depicts a sectional view taken along line E-E' shown in FIG. 16A;

FIG. 17A to 17D show a fabrication step subsequent to the step of FIGS. 16A and 16B, wherein FIG. 17A is a top plan view thereof, and FIGS. 17B to 17D depict sectional views taken along respective lines shown in FIG. 17A;

FIG. 19 is a table showing a suitable combination of the optical transmission axis of the polarizing films, direction of the longitudinal axis of LC molecules in the LC layer, direction of the optical axis of the λ/2 films with respect to the surface of the substrate;

DETAILED DESCRIPTION OF THE PREFERRED EMBODIMENTS

Figure 1A:
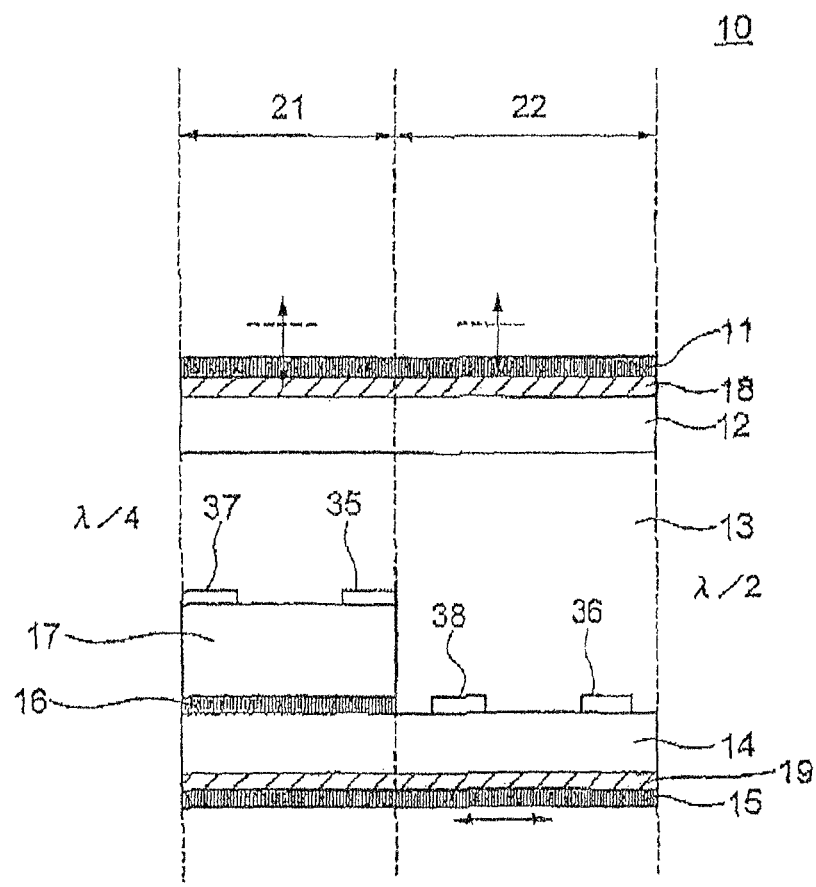
FIG. 1A is a sectional view showing the structure of a transflective LCD device according to a first embodiment of the present invention.

Embodiments of the present invention will be described below in detail with reference to the accompanying drawings. FIG. 1A shows the sectional structure of a LCD device according to a first embodiment of the present invention. The LCD device, generally designated at numeral 10, includes a first polarizing film 11, a first λ/2 film 18, a counter substrate 12, a LC layer 13, a TFT substrate 14, a second λ/2 film 19, and a second polarizing film 15, which are consecutively layered from the front side of the LCD device 10.

The LCD device 10 is configured as a transflective LCD device having a reflective area 21 and a transmissive area 22 in each pixel of the LCD device 10. In the reflective area 21, a reflection film 16 and an insulating film 17 are formed on the TFT substrate 14. The reflection film 16 reflects the incident light incident through the first polarizing film 11. In order to enhance light dispersion effect, the reflection film 16 typically has a rough surface.

A pixel electrode 35 for driving LC molecules and a common electrode 37 for supplying a reference potential are formed on the insulating film 17 in the reflective area 21. On the other hand, a pixel electrode 36 and a common electrode 38 are formed on the TFT substrate 14 in the transmissive area 22. The reflective area 21 uses the light reflected by the reflection film 16 as the light source for representing the image on the screen. The LCD device 10 has a backlight unit (not shown in the figure) below the second polarizing film 15, and the transmissive area 22 uses the backlight unit as the light source for representing the image on the screen.

In the transmissive area 22, the cell gap of the LC layer 13 is adjusted such that the retardation of the LC layer 13 assumes nearly λ/2. The reason for setting the retardation to "nearly λ/2" is to obtain an effective retardation of λ/2 by actually setting the retardation at (λ/2)+α. This margin α is necessary because, when the presence of applied voltage on the LC layer 13 rotates LC molecules, the LC molecules are rotated only in the central area of the cell gap, with the rotation of the LC molecules being suppressed near both the substrates. Assuming that retardation of the LC layer 13 is set at Δnd=300 nm, the effective retardation upon presence of applied voltage assumes $\Delta nd_{eff}$=λ/2=550/2=275 nm. On the other hand, in the reflective area 21, the cell gap is adjusted such that the effective retardation of the LC layer 13 upon presence of applied voltage assumes λ/4 by setting a suitable thickness for the insulating film 17.

In the transmissive area 22, upon display of a dark image, the linearly-polarized light emitted from the backlight unit and passing through the second polarizing film 15 is passed through the second λ/2 film 19, LC layer 13, and first λ/2 film 18 and enters the first polarizing film 11. In the configuration of the LCD device 10, the angle of the polarization axis and direction of the longitudinal axis of LC molecules are set such that the light entering the first polarizing film 11 assumes a linearly-polarized light and the polarized direction thereof corresponds to the direction of the absorption axis of the first polarizing film 11. Further, angle θ1 between the direction of the optical axis (or optical axis+90 degrees) of the LC layer 13 and the polarized direction of the light entering the LC layer 13 upon display of a dark image is set to satisfy the following relationship:

0 degree<θ1<45 degrees, and preferably satisfy the following relationship:

0 degree<θ1≦22.5 degrees.

In the description to follow, direction of the optical transmission axis of the first polarizing film 11 is set at 27 degrees, direction of the optical axis of the first λ/2 film 18 is set at 109.5 degrees, light transmission axis of the second polarizing film 15 is set at 63 degrees, direction of the optical axis of the second λ/2 film 19 is set at 70.5 degrees, direction of the longitudinal axis of LC molecules in the LC layer 13 upon absence of applied voltage is set at 90 degrees, and angle θ1 between the linearly-polarized light entering the LC layer 13 from the second λ/2 film 19 and direction of the optical axis (direction of the longitudinal axis) of the LC molecules is set at 12 degrees.

Figure 1B:
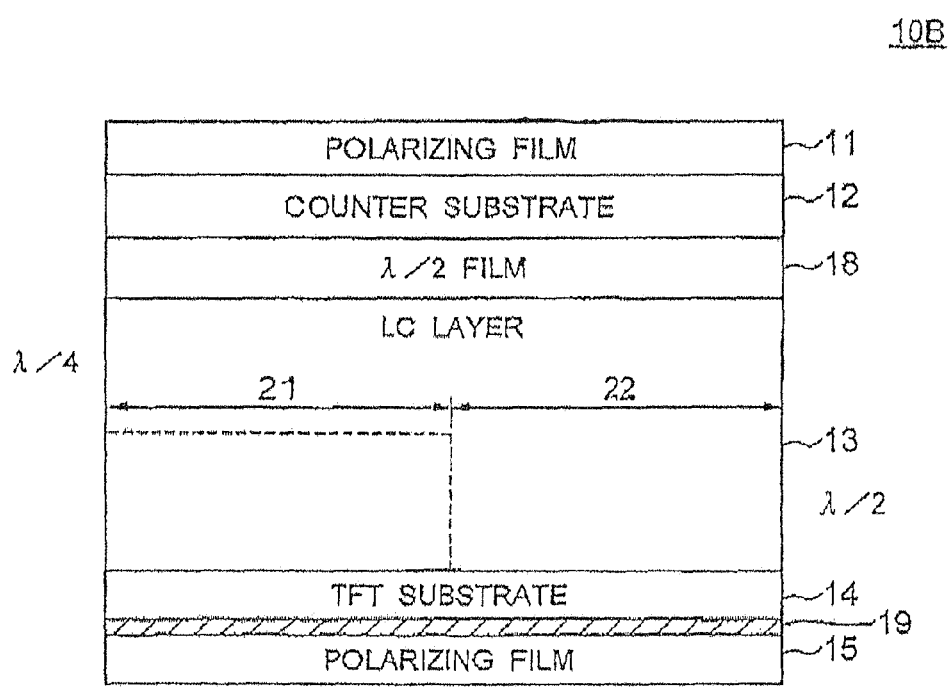
FIGS. 1B and 1C are modification from the structure of FIG. 1A.
Figure 1C:
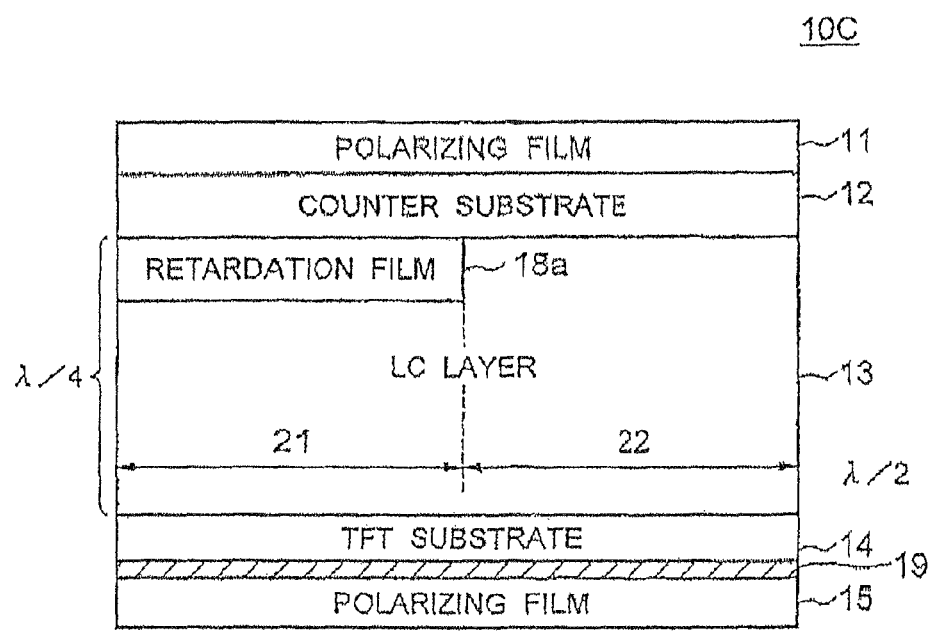

FIGS. 1B and 1C show modifications from FIG. 1A. In FIG. 1B, the λ/2 film 18 is provided between the LC layer 13 and the counter substrate 12, in both the transmissive and reflective areas 21 and 22, whereas in FIG. 1C, a retardation film 18a acting as a λ/4 film in association with the LC layer 13 is provided between the LC layer 13 and the counter substrate 12 only in the reflective area. It is sufficient in the LCD device of the present invention that the retardation film 18 or 18a be provided between the first polarization film 11 and the LC layer 13.

Figure 2:
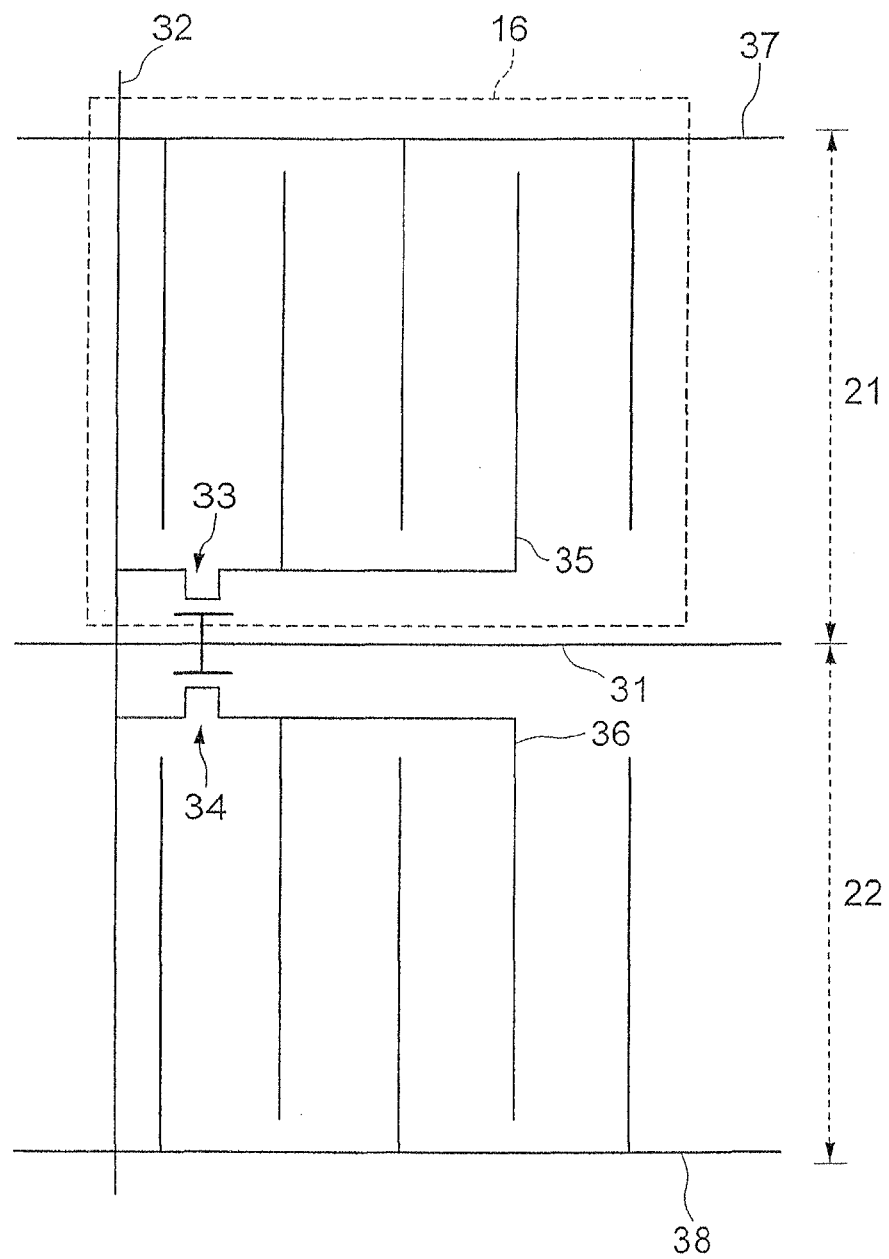
FIG. 2 is a top plan view showing the structure of the LCD device according to the first embodiment of the present invention.

FIG. 2 shows a top plan view of the TFT substrate 14 of the LCD device 10 shown in FIG. 1A, depicting the configuration of a single pixel therein. A gate line 31 and a data line 32 that cross each other at right angles are formed on the substrate 14. Near the intersection between the gate line 31 and the data line 32, TFTs 33 and 34 are formed in the reflective area 21, and transmissive area 22, respectively. The gate of the TFTs 33 and 34 is connected to the gate line 31, and one of the source and drain thereof are connected to the data line 32. The other of the source and drain of the TFTs 33 and 34 are connected to the pixel electrode 35 in the reflective area 21 and pixel electrode 36 in the transmissive area 22, respectively.

The first and second common electrodes 37 and 38 correspond to the reflective area 21 and transmissive area 22, respectively, of each pixel and have a part that extends along the gate line 31 and a part that protrudes toward the display area of the pixel. The first common electrode 37 is formed in the reflective area 21 at the position opposite to the pixel electrode 35 within the substrate plane. The second common electrode 38 is formed in the transmissive area 22 at the position opposite to the pixel electrode 36 within the substrate plane. A signal having a predetermined signal waveform and common to the array of pixels in the LCD device 10 is supplied to the first and second common electrodes 37 and 38. In the reflective area 21, the orientation of the LC layer 13 is controlled by an electric field corresponding to the potential difference between the pixel electrode 35 and the first common electrode 37. In the transmissive area 22, the orientation of the LC layer 13 is controlled by an electric field corresponding to the potential difference between the pixel electrode 36 and the second common electrode 38.

The pixel electrode 35 for the reflective area 21 and pixel electrode 36 for the transmissive area 22 are connected to the respective TFTs 33 and 34. TFTs 33 and 34 are connected to a common gate line 31 and to a common data line 32, whereby a common data signal is written in the pixel electrodes 35 and 36 when the TFTs 33 and 34 are turned on. The reason for the reflective area 21 and transmissive area 22 to use respective TFTs 33 and 34 and the respective pixel electrodes 35 and 36, in spite of the common data signal being written in the pixel electrode 35 for the reflective area 21 and pixel electrode 36 for transmissive area 22, is that the potential fluctuation is different between the pixel electrode 36 in the transmissive area 22 and the pixel electrode 35 in the reflective area 21, after the TFTs 33 and 34 have been turned off.

Figure 3A:
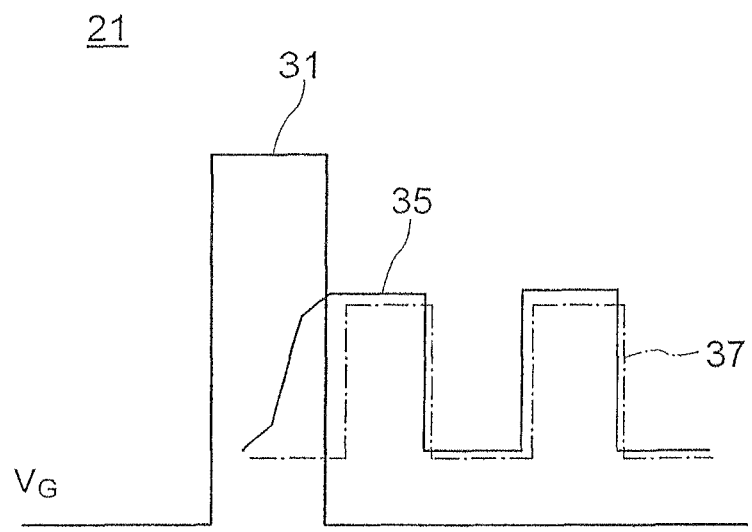
FIGS. 3A and 3B are waveform diagrams each showing potential change of the pixel electrodes 35 and 36 after the pixel data signal has been supplied to the pixel electrodes 35 and 36.
Figure 3B:
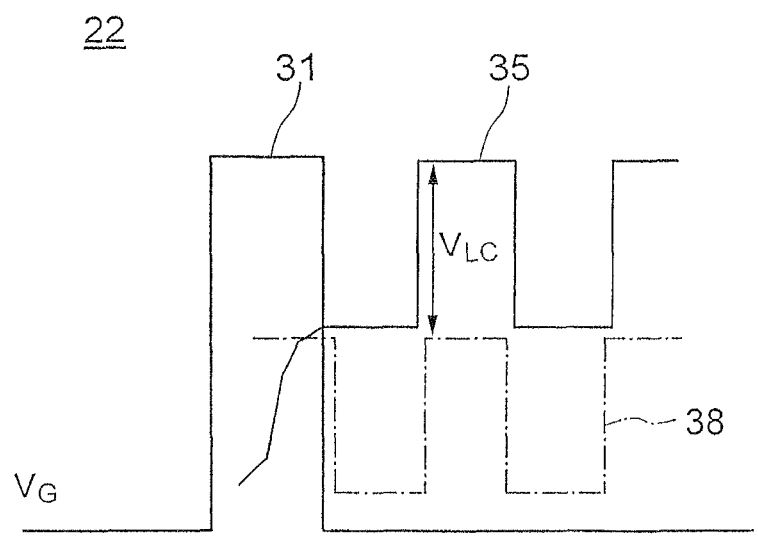

FIGS. 3A and 3B show the potential profile of the pixel electrodes 35 and 36 after the common pixel signal has been supplied to the pixel electrodes 35 and 36. For example, the polarity of the drive signal is inverted line by line in a gate-line-inversion drive scheme, whereby the potential of the first and second common electrodes 37 and 38 is iteratively inverted in accordance with the polarity inversion of each line during the time period between application of a gate signal pulse to the gate line 31 and another application of a gate signal pulse to the gate line 31 in the next frame.

Since the TFTs 33 and 34 are off at this stage, the pixel electrodes 35 and 36 are disconnected from the data line 32 to be in a floating state and, as shown in FIGS. 3A and 3B, the potential thereof is fluctuated in accordance with the potential profile of the first and second common electrodes 37 and 38, while keeping the potential difference upon the write of signal due to the coupling capacitance between the pixel electrode 35 and the first common electrode 37 and between the pixel electrode 36 and the second common electrode 38. As described above, the potential profile of the pixel electrodes 35 and 36 after the supply of pixel signal differs between the reflective area 21 and transmissive area 22. Thus, the pixel electrode should be separated between the reflective area 21 and transmissive area 22.

Figure 4A:
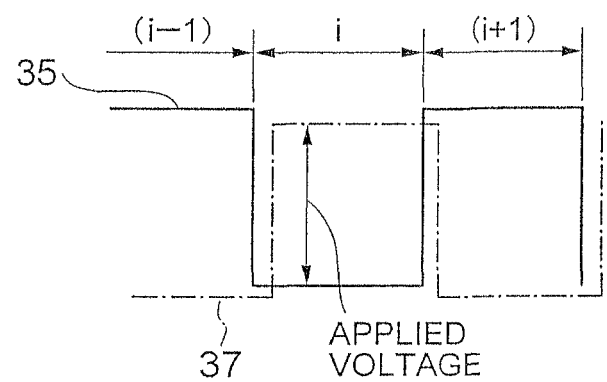
FIG. 4A is a waveform diagram showing a drive signal for the reflective area 21 in a specific stage.
Figure 4B:
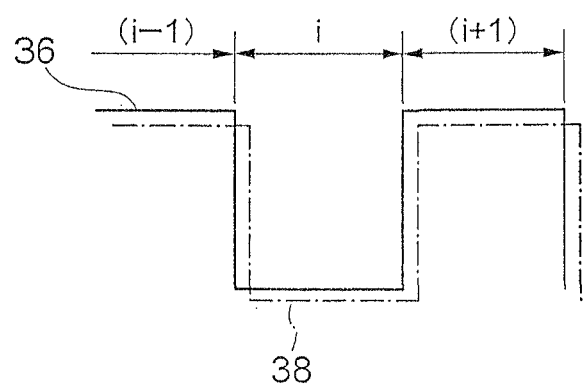
FIG. 4B is a waveform diagram showing a drive signal for the transmissive area 22 in the same specific stage.

FIG. 4A shows a drive signal waveform of the reflective area 21 in a specific stage, and FIG. 4B shows a drive signal waveform of the transmissive area 22 in the same specific stage. The LCD device 10 is driven by first and second common signals having an alternating voltage and, in each pixel, the potential (signal) applied to the first and second common electrodes 37 and 38 is inverted between, e.g., 0V and 5V in each frame, as shown in FIGS. 4A and 4B. Further, the inverted signal of the first common signal applied to the first common electrode 37 is applied to the second common electrode 38 as a second common signal.

A specific pixel signal ranging, e.g., between 0V and 5V is supplied to the pixel electrodes 35 and 36. Since the TFTs 33 and 34 are connected to the common data line 32, a common pixel signal is supplied to the pixel electrodes 35 and 36. As shown in FIG. 4A, when a 0V data signal is supplied to the pixel electrode 35 and a 5V common signal is applied to the first common electrode 37 in the i-th frame ("i" is a natural number), the potential difference between the pixel electrode 35 and the first common electrode 37 assumes 5V. Thus, in the reflective area 21, the LC layer 13 is driven by an electric field corresponding to a 5V potential difference. At this stage, a 0V signal is applied to the second common electrode 38, whereby the potential difference between the pixel electrode 36 and the second common electrode 38 assumes 0V. Thus, the LC molecules in the LC layer 13 are not driven in the transmissive area 22.

Figure 5A:
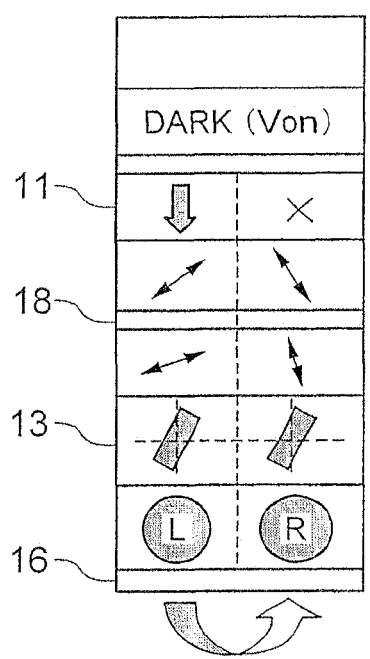
FIGS. 5A and 5B are schematic sectional views showing light polarization states in the reflective and transmissive areas when the signals shown in FIGS. 4A and 4B are applied.
Figure 5B:
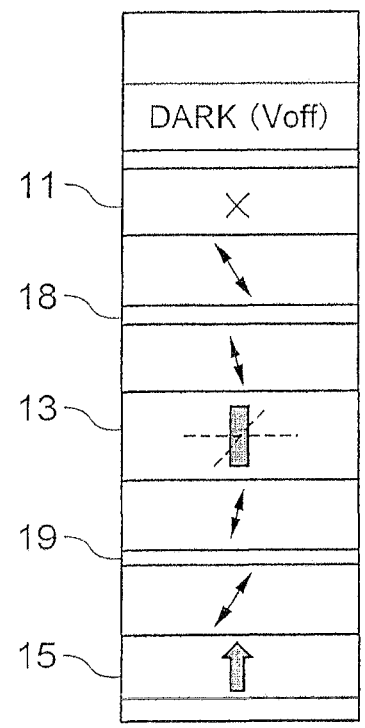

FIGS. 5A and 5B show polarization of the light in the reflective area 21 and transmissive area 22, respectively, upon application of the signals shown in FIGS. 4A and 4B. When the signal shown in FIG. 4A is applied, the orientation direction of LC molecules in the LC layer 13 in the reflective area 21 is rotated by 33 degrees (=45 degrees−θ1 (=12 degrees)) due to the electric field between the pixel electrode 35 and the first common electrode 37. That is, the direction of the longitudinal axis of LC molecules is changed from 90 degrees to 57 degrees.

In the reflective area 21, as shown in FIG. 5A, light that has entered the first polarizing film 11 from the outside of LCD device has been passed through the first polarizing film 11 to assume a 27-degree linearly-polarized light. The polarized direction of the 27-degree-linearly-polarized light is changed to 12 degrees after being passed through the first $\lambda/2$ film 18 and the 12-degree linearly-polarized light enters the LC layer 13 at an incident angle of 45 degrees with respect to the optical axis of the LC layer. The polarization of this incident light is changed upon being passed through the LC layer 13 to assume a counterclockwise-circularly-polarized light.

The counterclockwise-circularly-polarized light is then reflected by the reflection film 16 to be changed to a clockwise-circularly-polarized light. The clockwise-circularly-polarized light is passed through the LC layer 13 once again to assume a 102-degree linearly-polarized light, which is then passed through the first $\lambda/2$ film 18 to assume a 117-degree linearly-polarized light. Therefore, the light reflected by the reflection film 16 cannot be passed through the first polarizing film 11, with the result that the reflective area 21 assumes a dark state.

Although the drive voltage for maintaining the LC molecules at a constant orientation angle is increased in the reflective area 21 due to the narrow gap on the LC layer 13, the orientation angle to which LC molecules are driven is reduced to 33 degrees due to the angle θ1 being set at 12 degrees. As a result, it is possible to reduce the drive voltage down to 0.9 times, compared to the case where the LC molecules are rotated by 45 degrees.

On the other hand, in the state where the signal shown in FIG. 4B is applied, an electric field is not generated between the pixel electrode 36 and the second common electrode 38, whereby the direction of orientation of LC molecules in the transmissive area 22 is kept at 90 degrees. In the transmissive area 22, as shown FIG. 5B, 63-degree linearly-polarized light passing through the second polarizing film 15 is changed to 78-degree linearly-polarized light after being passed through the second $\lambda/2$ film 19 and then enters the LC layer 13. The direction of the longitudinal axis of LC molecules in the LC layer is at 90 degrees. Accordingly, the 78-degree linearly-polarized light that has entered the LC layer 13 assumes a 102-degree linearly-polarized light after being passed through the LC layer 13. The 102-degree linearly-polarized light then assumes a 117-degree linearly-polarized light after being passed through the first $\lambda/2$ film 18, which cannot be passed through the first polarizing film 11 having an optical transmission axis at 27 degrees, with the result that the transmissive area 22 assumes a dark state.

As described above, by inverting the first common signal applied to the first common electrode 37 to apply the inverted common signal to the second common electrode 38, the direction of orientation of LC molecules in the LC layer 13 can be changed only in the reflective area 21 while the common pixel signal is being supplied to the pixel electrodes 35 and 36. As a result, a dark state can be achieved in the transmissive area 22 when the dark state is represented in the reflective area 21. Thus, it is possible to display the dark state both in the reflective and transmissive areas without the need to supply different pixel signals to the reflective and transmissive areas 21 and 22.

Figure 6A:
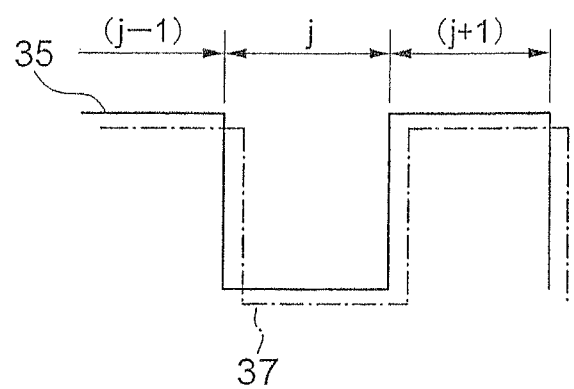
FIG. 6A is a waveform diagram showing a drive signal for the reflective area 71 in a stage different from FIG. 4.
Figure 6B:
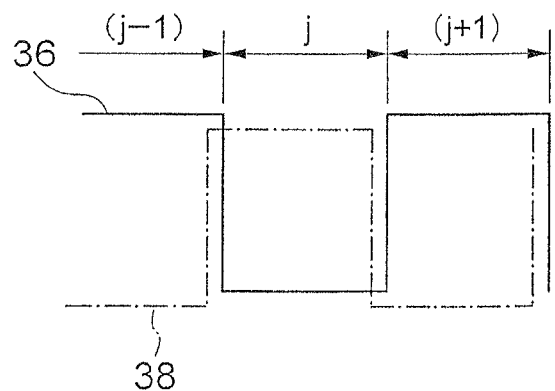
FIG. 6B is a waveform diagram showing a drive signal for the transmissive area 22 in the same phase as FIG. 6A.
Figure 7A:
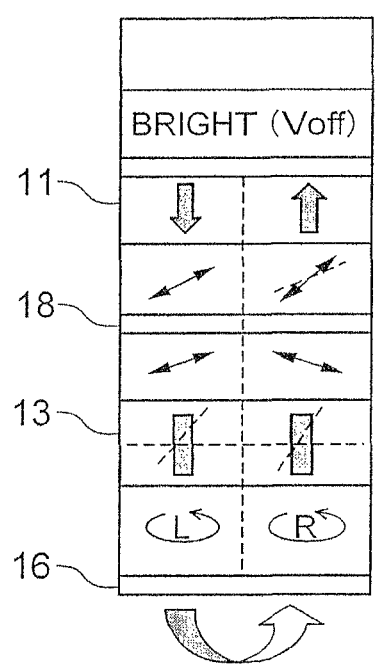
FIGS. 7A and 7B are schematic sectional views showing light polarization states in the reflective and transmissive areas when the signals shown in FIGS. 6A and 6B are applied.
Figure 7B:
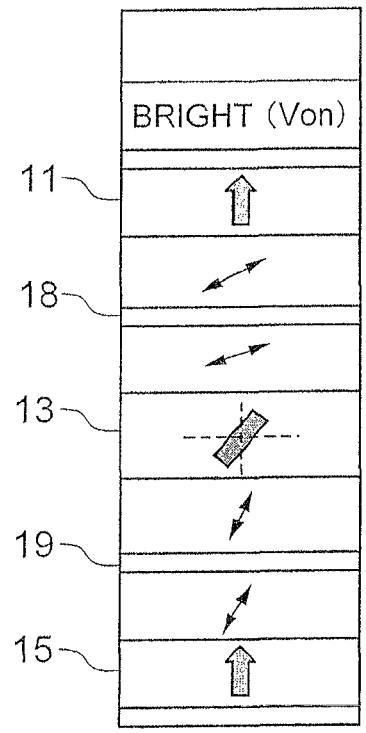

FIG. 6A shows a drive signal waveform of the reflective area 21 in a stage different from the stage shown in FIG. 4, and FIG. 6B shows another drive signal waveform of the transmissive area 22 in the same stage as that of FIG. 6A. FIGS. 7A and 7B show polarization of light in the reflective and transmissive areas 21 and 22 when the signals shown in FIGS. 6A and 6B are applied. In the state where the signal shown in FIG. 6A is applied, an electric field is not generated between the pixel electrode 35 and the first common electrode 37, whereby the direction of orientation of LC molecules in the reflective area 21 is kept at 90 degrees.

In the reflective area 21, as shown FIG. 7A, a 12-degree linearly-polarized light passing through the first polarizing film 11 and first λ/2 film 18 is passed through the LC layer 13, reflected by the reflection film 16, and passed once again through the LC layer 13 to assume a −12-degree linearly-polarized light. The −12-degree linearly-polarized light is passed through the first λ/2 film 18 to assume a 51-degree linearly-polarized light, which enters the first polarizing film 11. Since the direction of optical transmission axis of the first polarizing film 11 is at 27 degrees, all the components of light assuming a 51-degree linearly-polarized light and reflected by the reflection film 16 travels toward the first polarizing film 11; however, cannot pass through the first polarizing film 11. In this state, a highest reflectivity achieving a highest luminance is obtained, whereby the reflective area 21 assumes a bright state.

The angle deviation between the polarized direction of light entering the first polarizing film 11 from the reflection film 16 in a bright state and the direction of the optical transmission axis of the first polarizing film 11 can be represented by θ1×2. More specifically, if the angle θ1 is set at zero degree, the brightest image can be displayed and, for example, the reflectivity obtained when θ1 is set displayed and, for example, the reflectivity obtained when θ1 is set at 12 degrees assumes 0.9 times the case where θ1 is set at zero degree.

As described above, by increasing the angle θ1, the angle by which LC molecules are driven can be reduced to thereby reduce a drive voltage. However, there is a tradeoff in the relationship between the decrease in the drive voltage and increase in the reflectivity. In designing a LCD device, the angle θ1 should be set in consideration of a balance between the drive voltage and the reflectivity.

In a state where the signal shown in FIG. 6B is applied, the direction of orientation of LC molecules in the LC layer 13 in the transmissive area 22 is rotated by 45 degrees due to the electric field between the pixel electrode 36 and the second common electrode 38. Thus, in the transmissive area 22, as shown in FIG. 7B, a 78-degree linearly-polarized light passing through the second polarizing film 15 and second λ/2 film 19 is rotated by 90 degrees relative to the angle upon display of a dark image after being passed through the LC layer 13, to thereby assume a 12-degree linearly-polarized light. The 12-degree linearly-polarized light then enters the first λ/2 film 18 to assume a 27-degree linearly-polarized light, which enters the first polarizing film 11. As a result, the transmissive area 22 assumes a bright state.

As described above, by inverting the signal applied to the first common electrode 37 to apply the inverted signal to the second common electrode 38, a bright state can be achieved in the transmissive area 22 upon representing the bright image in the reflective area 21. Thus, it is possible to achieve the dark state both in the reflective and transmissive areas by using the signals shown in FIGS. 6A and 6B.

In the present embodiment, the common electrode is divided into the first and second common electrodes 37 and 38 so that the first and second common electrodes 37 and 38 correspond to the reflective area 21 and transmissive area 22, respectively. Opposite signals or inverted signals, which allow magnitude of the electric fields applied to the LC layer 13 to be reversed between the reflective area 21 and the transmissive area 22, are supplied to the first and second common electrodes 37 and 38. This enables the reflective area 21 and the transmissive area 22 of each pixel to provide the same image without the need to supply different pixel signals to the reflective area 21 and transmissive area 22, thereby eliminating the disadvantage that the inverted data signals must be applied between the reflective area and the transmissive area of each pixel in the IPS-mode transflective LCD device.

In the structure of the LCD device 10C shown in FIG. 1C, the retardation film 18a provided only in the reflective area and acting as the λ/4 film in association with the LC layer 13 has a function similar to that of the LC layer 13 described in the conventional structure. More specifically, a 90-degree linearly-polarized light passing through the first polarizing film 51 passes the LC layer 53 and the retardation film 18a. Since the polarized direction of the light that has passed the LC layer 53 and the retardation film 18a is deviated by 45 degrees from the direction of the longitudinal axis of LC molecules and the retardation of the liquid crystal and retardation film 18a in combination is set at λ/4, the 90-degree linearly-polarized light that passes the LC layer 53 and retardation film 18a assumes a clockwise-circularly-polarized light, which enters the reflection film 54. The clockwise-circularly-polarized light is reflected by the reflection film to be changed into a counterclockwise-circularly-polarized state. The counterclockwise-circularly-polarized light that has entered the LC layer 53 passes therethrough once again to be changed into a horizontal (0-degree) linearly-polarized light. The horizontal-linearly-polarized light then enters the first polarizing film 51. Since the direction of the polarization axis of the first polarizing film 51 is at 90 degrees, the light reflected by the reflection film 54 cannot be passed through the first polarizing film 51, with the result that a dark image (black) is represented on the screen. Thus, the configuration of FIG. 1C provides a function similar to the function obtained by the structure of FIG. 1A.

In the structure of FIG. 1A showing the present embodiment, the angle θ1 between the direction of orientation of the LC layer 13 and the polarized direction of the light entering the LC layer 13 upon display of a dark image is set to satisfy the relationship;

0 degree<θ1<45 degrees, and preferably the relationship:

0 degree<θ1≦22.5 degrees.

Figure 23:
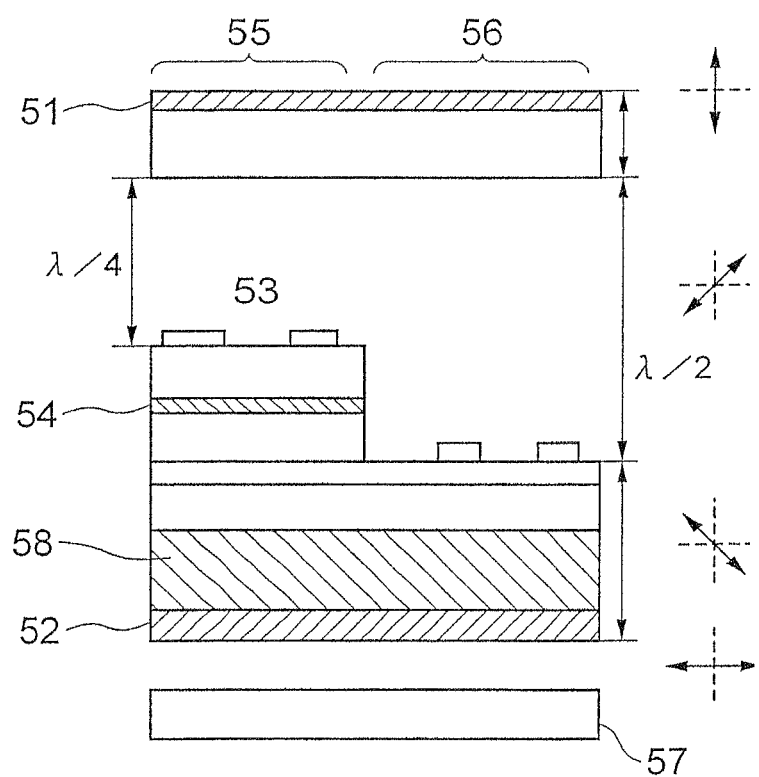
FIG. 23 is a sectional view showing the structure and polarized state of the light in the conventional transflective LCD device described in a patent publication.

As a result, it is possible for the LCD device according to the present embodiment to reduce the adverse affect caused by wavelength dispersion characteristics of the LC layer 13 upon display of a dark image, as compared to the conventional transflective LCD device 50a (FIG. 23), thereby preventing leakage light in a dark state.

In a typical TN-mode LCD device, a reflection film is configured by a reflection pixel electrode, to which a pixel signal for driving the LC layer in accordance with the desired gray-scale level is supplied. On the other hand, since the LC layer 13 is driven by the electric field generated between the pixel electrode 35 and the common electrode (first common electrode) 37 in the IPS mode, the potential to be applied to the reflection film 16 can arbitrarily be determined. In, the following description, the influence that the potential of the reflection film 16 exerts on the image in the reflective area 21 will be discussed.

Figure 8A:
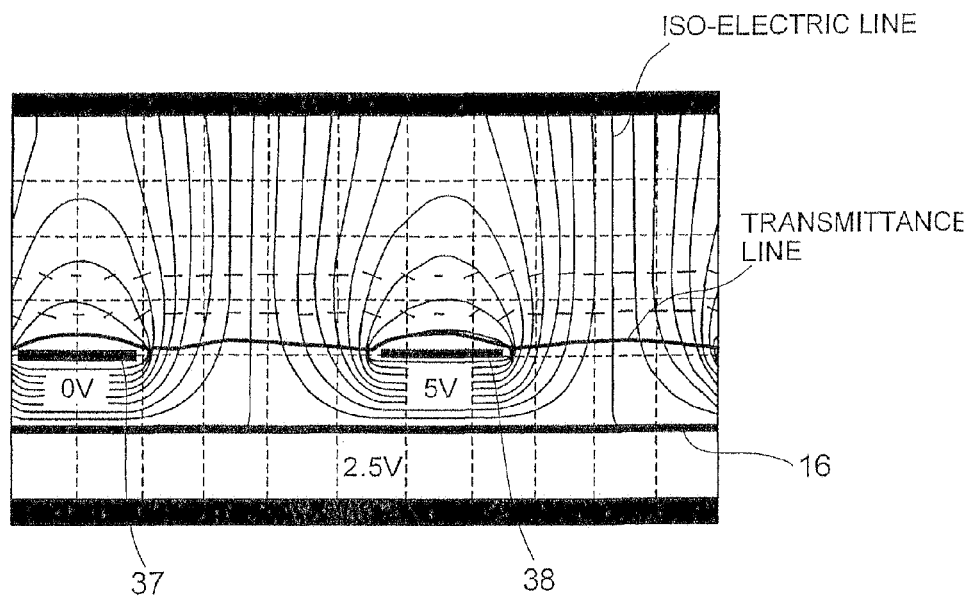
FIGS. 8A and 8B are diagrams each obtained by simulation and showing electric field distribution and light transmittance in a dark state.
Figure 8B:
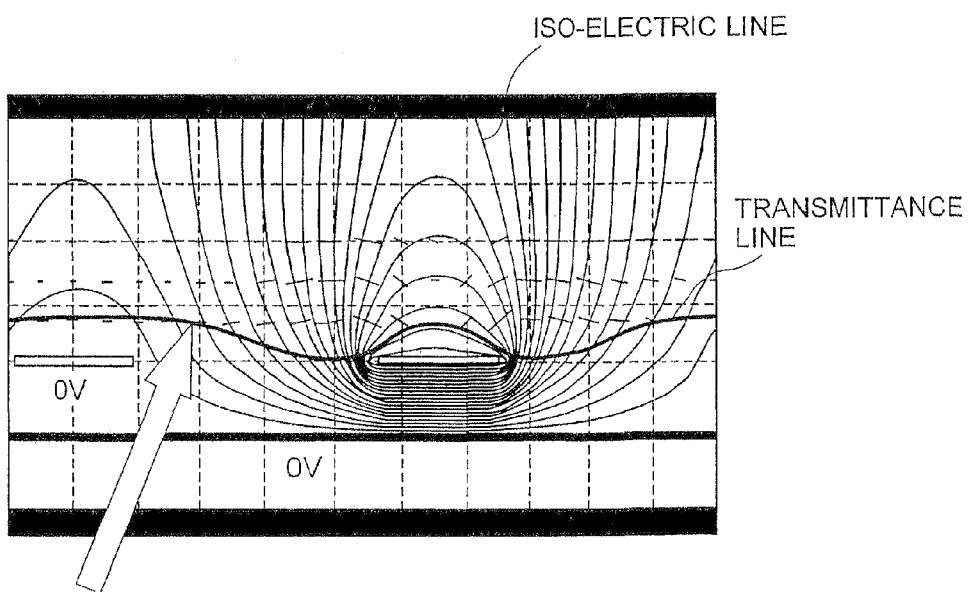

FIGS. 8A and 8B, which are obtained by simulation, show the electric field distribution in the LC layer by using iso-electric lines and light transmittance by using iso-transmittance lines as well as gray scale levels, both in the case of a dark state. FIG. 8A shows the case wherein the pixel electrode 35 applied with a 5V signal and the common electrode 37 applied with a 0V signal maintain the potential of the reflection film, i.e., reflection electrode, 16 at an intermediate potential (2.5V) therebetween. FIG. 8B shows the case wherein the pixel electrode 35 is applied with a 5V signal and the common electrode 37 is applied with a 0V signal, and the potential of the reflection film 16 is maintained at the same potential (0V) as the common electrode 37.

If the potential of the reflection film 16 assumes an intermediate potential between the pixel electrode 35 and common electrode 37, as shown in FIG. 8A, although leakage light occurs on the pixel electrode 35 and common electrode 37 to increase the transmittance, the leakage light is suppressed at the portion between both the electrodes to reduce the light transmittance. On the other hand, if the potential of the reflection film 16 assumes the same potential as the common electrode 37, as shown in FIG. 8B, leakage light increases in the vicinity of the common electrode 37, as indicated by a thick arrow, to thereby increase the light transmittance in this area. This is considered due to the fact that the electric field between the pixel electrode 35 and the reflection film 16 is strong so that the electric lines of force, which are supposed to converge between the pixel electrode 35 and the common electrode 37, are directed to the reflection film 16, with the result that LC molecules in the vicinity of the common electrode 37 are not sufficiently driven.

The above simulation reveals that it is preferable that the potential of the reflection film 16 be an intermediate potential between the pixel electrode 35 and the common electrode 37. In this respect, it is possible to control the potential of the reflection film 16 by directly applying a desired potential to the reflection film 16. In an alternative, it is possible to control the potential of the reflection film 16 through capacitive coupling while adopting a floating state thereof. For example, if the floating potential is to be employed, an interconnect that can apply the potential of the pixel electrode 35 and another interconnect that can apply the potential of the common electrode 37 are formed right under the reflection film 16 such that the area ratio between the interconnects assumes 1:1, whereby the potential of the reflection film 16 is controlled at the intermediate potential between the pixel electrode 35 and the common electrode 37.

Figure 9:
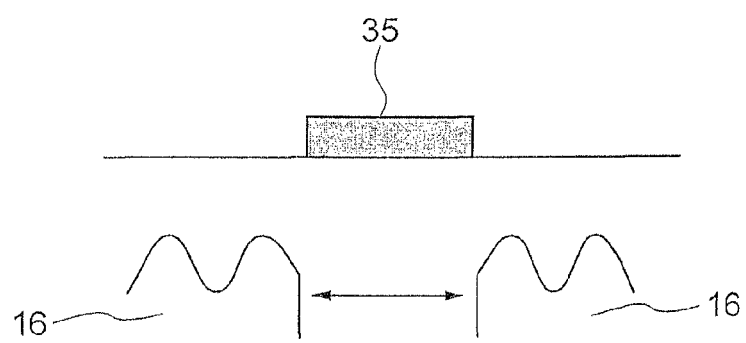
FIG. 9 is a sectional view showing the structure of the reflection film 16 right under the pixel electrodes 35 and 36 and common electrode 37.

Since the leakage light occurs on the pixel electrode 35 and common electrode 37 as shown in FIG. 8A, the brightness upon display of a dark image cannot be sufficiently reduced without using a suitable countermeasure. In order to suppress the influence by the leakage light, patterning should be made such that the reflection film 16 is not formed right under the pixel electrode 35 or common electrode 37, as shown in FIG. 9. This reduces the brightness of reflected light observed at the positions on which the pixel electrode 35 and common electrode 37 are formed, thereby reducing the brightness upon display of a dark image.

Hereinafter, a fabrication process for the TFT substrate 14 shown in FIG. 1A will be described with reference to FIGS. 10A to 10D through FIGS. 17A to 17D showing respective steps of fabrication. In each of these drawings, the drawing having "A" character attached with the drawing number is a top plan view of the TFT substrate in a specific step, and other figures having the same drawing number attached with "B" to "D" are sectional views showing the same step as the drawing of the corresponding number and taken along lines A-A', B-B' and C-C', respectively, shown in FIG. 10A, unless otherwise specified, Firstly, the gate line 31 shown in FIG. 2, a first common electrode line 37a, and a second common electrode line 38a are formed on a substrate body of the TFT substrate, in such patterns as shown in FIG. 10A. Sections of the reflective area 21, transmissive area 22, and the interface (step portion) between the reflective area 21 and the transmissive area 22 obtained at this step axe shown in FIGS. 10B to 10D, respectively. In the reflective area 21, the first common electrode line 37a is so formed as to project in the display area, thereby supplying a potential to the reflection film 16. Thereafter, the gate line 31, first common electrode line 37a, and second common electrode line 38a are covered by an insulating film.

Subsequently, as shown in FIG. 11A, a semiconductor layer 39 for forming thereon the TFT 33 is provided. As shown in FIG. 11B, the semiconductor layer 39 is formed so as to overlap the gate line or gate electrode 31. Thereafter, pixel electrode lines 35a and 36a are formed in such patterns as shown in figure FIG. 12A. The pixel electrode line 35a is connected to one of the ends of the source/drain path of the TFT 33, and the pixel electrode line 36a is connected to the other of the ends of the source/drain path of the TFT 34.

Sections of the reflective area 21, transmissive area 22, and interface between the reflective area 21 and the transmissive area 22 obtained at this step are shown in figures FIGS. 12B to 12D, respectively. In the reflective area 21, the first common electrode line 37a is formed between adjacent two of the pixel electrode lines 35a. The first common electrode line 37a is formed such that the area ratio between the pixel electrode line 35a and the first common electrode line 37a is 1:1 in the display area. With this configuration, the intermediate potential between the potentials of the pixel electrode 35 and the first common electrode 37 can be applied to the reflection film 16, which is to be formed later. After the formation of the first and second common electrode lines 37a and 38a, these lines are covered by an insulating film.

Figure 14A:
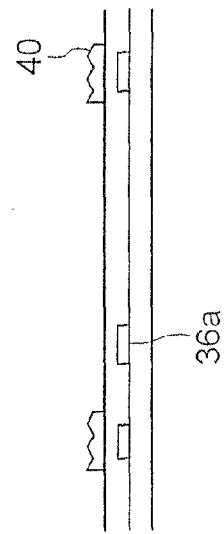
Figure 14B:
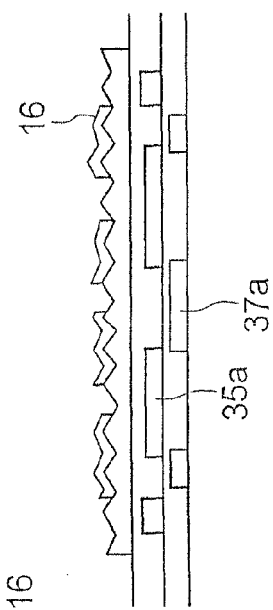
Figure 14D:
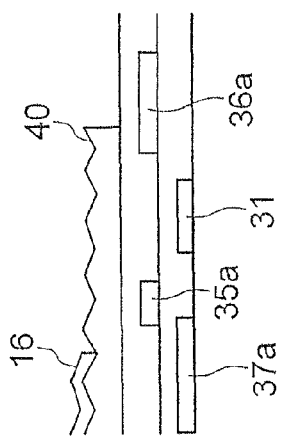
Figure 14C:
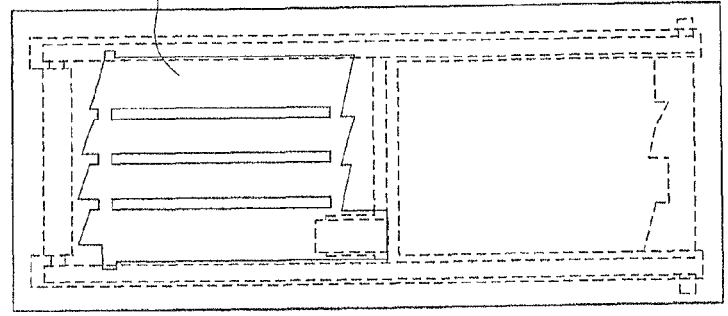

Subsequently, an overcoat (OC) layer 40 having a rough surface is formed thereon, as shown in FIGS. 13A to 13D. An aluminum (Al) layer is formed on the rough OC layer 40, and the reflection film 16 is formed thereon in the reflective area 21 in such a pattern as shown in FIG. 14A. Sections of the reflective area 21, transmissive area 22, and interface between the reflective area 21 and transmissive area 22 obtained at this stage are shown in FIGS. 14B to 14D, respectively. As shown in FIG. 14B, in the reflective area 21, the Al layer is selectively etched in the region right under the pixel electrode 35a and first common electrode 37a, to form a reflection film 16 having an opening therein.

After the formation of the reflection film 16, a flat OC layer 41 is formed in such a pattern as shown in FIG. 15A. The formation of the flat OC layer 41 causes a step difference on the interface between the reflective area 21 and the transmissive area 22 as shown in FIGS. 15B to 15D, with the result that the cell gap is adjusted in the respective areas. Thereafter, contact holes 42 are formed in the insulating 111111 that covers the pixel electrode lines 35a, 36a and first and second common electrode lines 37a, 38b at the portions shown in FIG. 16A to expose the pixel electrode lines 35a and 36a, and the first and second common electrode lines 37a and 38a (FIG. 16B).

After the formation of the contact holes, the pixel electrodes 35 and 36 and first and second common electrodes 37, 38 are formed on the flat OC layer 41 in such pattern as shown in FIG. 17A. Sections of the reflective area 21, transmissive area 22, and interface between the reflective area 21 and transmissive area 22 obtained at this stage are shown in FIGS. 17B to 17D, respectively. In this fabrication process, these electrodes are connected to the pixel electrode lines 35a, 36a and the first and second common electrode lines 37a, 38a through the contact holes 42. In this manner, the TFT substrate 14 used for the transflective LCD device 10 according to the present embodiment is obtained.

Figure 18:
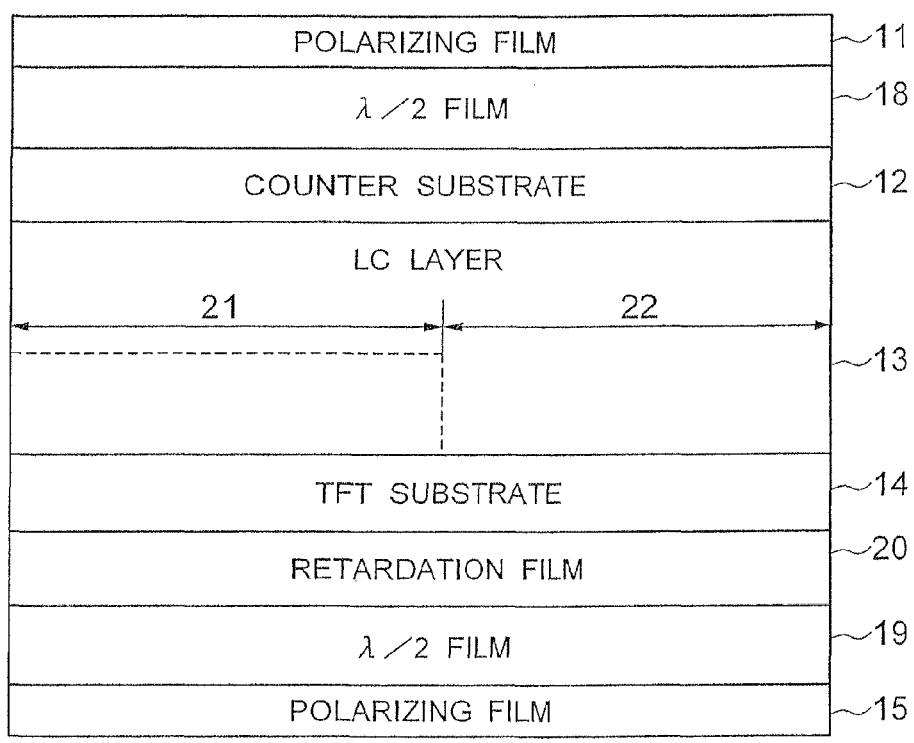
FIG. 18 is a schematic sectional view showing the structure of a transflective LCD device according to a second embodiment of the present invention.

FIG. 18 shows the sectional structure of a transflective LCD device according to a second embodiment of the present invention. The LCD device, generally designated at numeral 10a, according the second embodiment is similar to the LCD device 10 of the first embodiment shown in FIG. 1A except that a retardation film 20 is disposed between the TFT substrate 14 and the second λ/2 film 19. In the present embodiment, the angle (31 between the polarized direction of the linearly-polarized light entering the LC layer 13 upon display of a dark image and the direction of the optical axis of the LC layer is set at zero degree in the transmissive area 22.

Assuming that the retardation film 20 has a refractive index of nx in the direction of the slow axis, a refractive index ny in the direction of the fast axis, a refractive index nz in the thickness direction, and a thickness of d, the following relationship:

$$(nx-nz)/(nx-ny) \leq 0.3; \text{ or}$$

$$(nx-nz)/(nx-ny) = 1.0$$

is satisfied. Further, the value defined by:

$$(nx-ny) \times d$$

is set nearly equal to the retardation of the LC layer 13.

The retardation film 20 is disposed such that the direction of the longitudinal axis of LC molecules in the LC layer 13 and the direction of the fast axis of the retardation film 20 are parallel or perpendicular to each other. If the retardation film 20 satisfies the following relationship:

$$(nx-nz)/(nx-ny) = 1.0$$

and is disposed in parallel to the optical axis of the LC layer, it is preferable to use the retardation film 20 having a configuration, wherein the wavelength dispersion of the birefringence is a reverse dispersion.

FIG. 19 shows a combination of polarizing films, LC layer and retardation films having a suitable relationship of the directions for the polarization axis and optical axis thereof. In this table, the values entered in the columns indicate the angles of the direction of the optical transmission axis of the polarizing films 11 and 15, direction of the longitudinal axis of the LC molecules in the LC layer 13, direction of the in-plane optical axis of the first and second λ/2 films 18, 19, and direction of the in-plane optical axis of the retardation film 20. In the combination shown in FIG. 19, the polarized direction of light passing through the second polarizing film 15, second λ/2 film 19 and retardation film 20 and entering the LC layer 13 is determined to be parallel or perpendicular to the direction of the longitudinal axis of LC molecules in the LC layer 13. This configuration is determined for the purpose of preventing the amount of leakage light upon display of a dark image in the transmissive area 22 from being increased, for each case of the refractive index Nz of the thickness direction of the retardation film being Nz≦0.3 and Nz=0.

Figure 20:
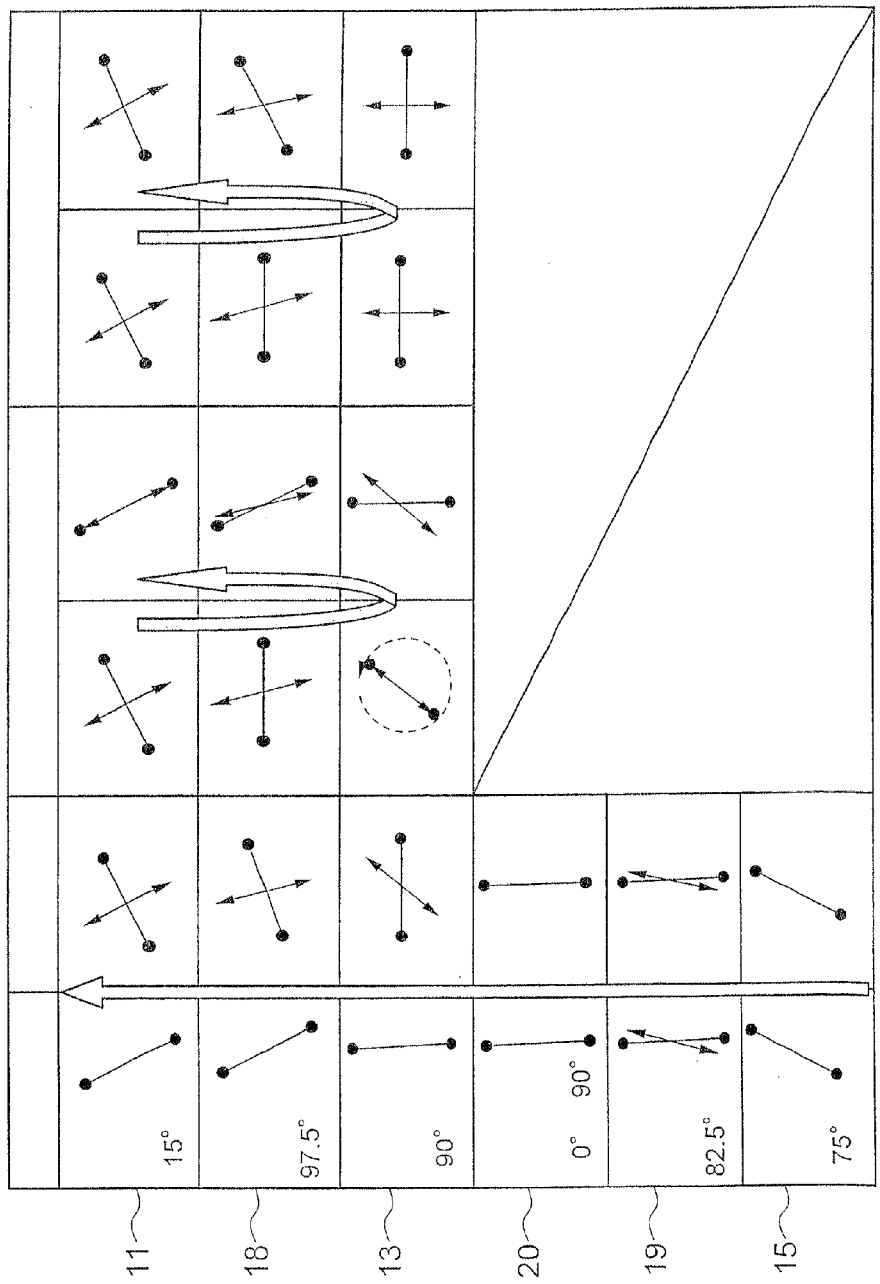
FIG. 20 is a schematic view showing the polarized state of the light in the LCD device of the second embodiment.

The image obtained in the LCD device 10a adopting the combination shown in FIG. 19 will be described with reference to FIG. 20. Image of a dark image will be first described. Upon representing the dark state, the signals shown in FIGS. 4A and 4B may be applied, whereby the direction of the longitudinal axis of LC molecules in the LC layer 13 in the reflective area 21 is rotated to the direction of 45 degrees, whereas the direction of the longitudinal axis of LC molecules in the LC layer 13 in the transmissive area 22 is kept at 90 degrees.

In the transmissive area 22, the light emitted from the backlight unit is passed through the second polarizing film 15 having an optical transmission axis at 75 degrees, which is equal to the light absorption axis minus 15 degrees, to assume a 75-degree linearly-polarized light. The 75-degree linearly-polarized light is then passed through the second λ/2 film 19. At this stage, the polarized direction of the 75-degree linearly-polarized light is rotated by an angle equal to double the difference between the same and the direction of the optical axis, 825 degrees, of the second λ/2 film 19, thereby assuming a 90-degree or 270-degree linearly-polarized light.

The 90-degree linearly-polarized light is passed through the retardation film 20 and LC layer 13, with the polarized axis being maintained at 90 degrees. Then, the 90-degree linearly-polarized light is passed through the first λ/2 film 18 to assume a 105-degree linearly-polarized light, which enters the first polarizing film 11. Since the optical transmission axis of the first polarizing film 11 is at 15 degrees, the light transmitted from the backlight unit cannot be passed through the first polarizing film 11, resulting in display of a dark image.

Although components of the light entering the retardation film 20 and LC layer 13, other than the component having a wavelength of 550 nm, assume an elliptically-polarized light due to the wavelength dispersion by the first and second λ/2 films 18 and 19, the retardation film 20 compensates the wavelength dispersion of the components of the linearly-polarized light entering the LC layer 13, other than the component having a wavelength of 550 nm, to thereby suppress leakage light or coloring on the light emitting side.

In the reflective area 21, the 15-degree linearly-polarized light passing through the first polarizing film 11 having an optical transmission axis at 15 degrees is then passed through the first λ/2 film 18 to assume a 0-degree (or 180-degree) linearly-polarized light, which enters the LC layer 13. The 0-degree linearly-polarized light that has entered the LC layer 13 assumes a counterclockwise-circularly-polarized light upon being passed through the LC layer 13.

The counterclockwise-circularly-polarized light is then reflected by the reflection film 16 to assume a clockwise-circularly-polarized light. The clockwise-circularly-polarized light is passed through the LC layer 13 to assume a 90-degree linearly-polarized light, which enters the first λ/2 film 18. The 90-degree linearly-polarized light then assumes a 105-degree linearly-polarized light upon being passed through the first λ/2 film 18. The 105-degree linearly-polarized light cannot be passed through the first polarizing film 11, resulting in display of a dark image.

The description will next be given of a bright image. Upon representing a bright image, the signals shown in FIGS. 6A and 6B may be applied, whereby the direction of the longitudinal axis of LC molecules in the LC layer 13 in the transmissive area 22 is rotated to the direction of 45 degrees, whereas the direction of the longitudinal axis of LC molecules in the LC layer 13 in the reflective area 21 is kept at 90 degrees.

In the transmissive area 22, the light emitted from the backlight unit is passed through the second polarizing film 15 having an optical transmission axis at 75 degrees to assume a 75-degree linearly-polarized light. The 75-degree linearly-polarized light is then passed through the second $\lambda/2$ film 19 to assume a 90-degree (or 270-degree) linearly-polarized light, which enters the retardation film 20 and LC layer 13. Since the direction of the optical axis of the retardation film 20 and polarized direction of the light entering the retardation film 20 are parallel to each other, the 90-degree linearly-polarized light is passed through the retardation film 20 with the polarized axis thereof being kept at 90 degrees. The 90-degree linearly-polarized light then assumes a 0-degree linearly-polarized light upon being passed through the LC layer 13. The 0-degree linearly-polarized light is then passed through the first $\lambda/2$ film 18 to assume a 15-degree linearly-polarized light. The 15-degree linearly-polarized light is passed through the first polarizing film 11, resulting in representing a bright image.

In the reflective area 21, the 15-degree linearly-polarized light passing through the first polarizing film 11 having an optical transmission axis at 15 degrees is then passed through the first $\lambda/2$ film 18 to assume a 0-degree (180-degree) linearly-polarized light, which enters the LC layer 13. The 0-degree linearly-polarized light that has entered the LC layer 13 is passed through the LC layer 13, with the polarized axis thereof being kept at zero degree, reflected by the reflection film 16, and is passed through the LC layer 13 once again. The 0-degree linearly-polarized light passing through the LC layer 13 is passed through the first $\lambda/2$ film 18 to assume a 15-degree linearly-polarized light. The 15-degree linearly-polarized light is passed through the first polarizing film 11, resulting in representing a bright image.

In the first embodiment, the angle $\theta1$ is set to satisfy the following relationship:

$$0 \text{ degree} < \theta1 < 45 \text{ degrees,}$$

and preferably satisfy the following relationship:

$$0 \text{ degree} < \theta1 \leq 22.5 \text{ degrees.}$$

Thus, it is possible to cancel the phase difference between the first $\lambda/2$ film and the second $\lambda/2$ film 19 by the retardation of the LC layer 13. However, in the present embodiment, the angle $\theta1$ is set at zero degree, and thus coloring of the dark image toward blue color may be observed in the transmissive area 22 in some cases due to accumulation of the phase difference between the first $\lambda/2$ film 18 and the second $\lambda/2$ film 19. In the present embodiment, the retardation film 20 performs the optical compensation to thereby solve this problem.

Figure 21:
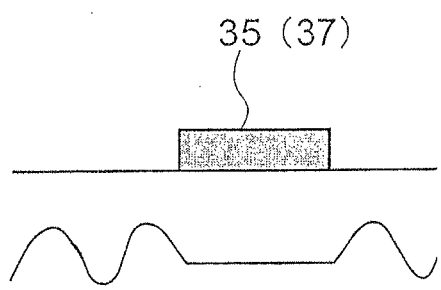
FIG. 21 is a sectional view showing the reflection film 16 right under the pixel electrode 34 and common electrode 35.
Figure 22A:
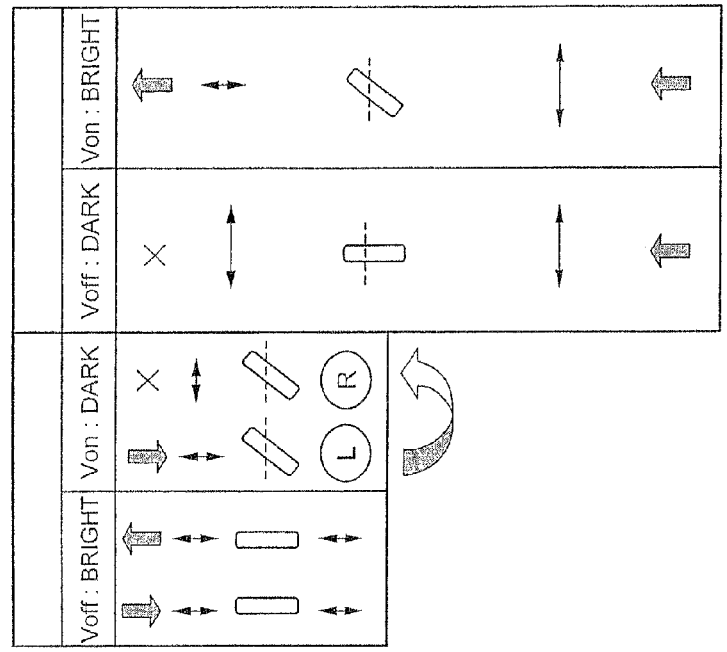
FIG. 22A is a schematic sectional view showing a conventional transflective LCD device.
Figure 22B:
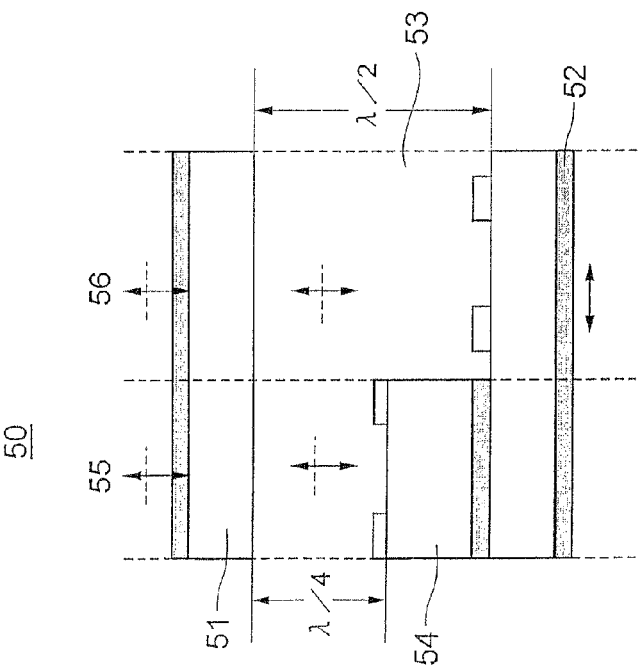
FIG. 22B is a schematic view showing the polarized state of light in the reflective and transmissive areas of the LCD device of FIG. 22A when the light is passed through the first polarizing film, LC layer, and second polarizing film.

Although, in the first embodiment, the reflection film 16 is not formed right under the pixel electrodes 35, 36 and first and second common electrodes 37 and 38 in the reflective area 21, the present invention is not limited to this configuration, so long as the portion right under these electrodes does not function as the light source. For is example, as shown in FIG. 21, part of the reflection film 16 that is located right under the electrode 35 or 37 can be formed flat. In this case, a scatter reflection will not occur in the portion right under the electrode, rendering the portion darker than the other portion. As a result, it is possible to reduce the influence by leakage light observed on the electrode. Further, although the angle $\theta1$ is more than zero degree in the first embodiment, the angle $\theta1$ may be set at zero degree.

In a LCD device, a wide wavelength range can be achieved by using a plurality of retardation films, which are layered one on another so that the slow axes thereof are not parallel or perpendicular to each other. This is described in, for example, "Retardation film and polarizer having a wider viewing angle and a large wavelength range" (Shingakugiho) written by Takahiro Ishinabe, Tetsuya Miyashita, and Tatsuo Uchida, January, 2001, pp. 56. The LC layer 13 can also be considered as a kind of a retardation film. Thus, even if the second $\lambda/2$ film 19 is omitted, a wide wavelength range can be achieved by layering the first $\lambda/2$ film 18 and LC layer 13. In this case, the optical transmission axis of the second polarizing film 15 is set such that the angle between the direction of the optical axis of the LC layer 13 and the polarized direction of the incident light assumes $\theta1$. More specifically, if the direction of the longitudinal axis of LC molecules is at 90 degrees and $\theta1$ is 12 degrees, the optical transmission axis of the second polarizing film 15 should be set at 78 degrees. It is to be noted however that the wavelength dispersion of the $\lambda/2$ film is generally smaller than the wavelength dispersion of the LC layer 13, and thus it is preferable to use a layer structure of the first and second $\lambda/2$ films 18 and 19 in order to achieve a wider wavelength range.

As described above, the transflective LCD device of the present invention achieves reduction of the coloring and/or leakage light especially upon display of a dark image.

As described above in connection with the LCD device of the above embodiments, each of the pixels may include a pixel electrode driven by a pixel data signal supplied common to the transmissive area and the reflective area, a first common electrode driven by a first common signal supplied common to the reflective areas of the plurality of pixels, and a second common electrode driven by a second common signal supplied common to the transmissive areas of the plurality of pixels.

In addition, the angle $\theta1$ between an optical axis of the LC layer in the transmissive area upon display of a dark image and a polarized direction of light incident onto the LC layer may satisfy the following relationship:

$$\text{zero degree} \leq \theta1 < 45 \text{ degrees.}$$

Further, the angle $\theta1$ may satisfy the following relationship:

$$\text{zero degree} \leq \theta1 \leq 22.5 \text{ degrees.}$$

Further, the angle $\theta2$ between an optical axis of the LC layer in the reflective area upon display of a dark image and a polarized direction of light incident onto the LC layer may satisfy the following relationship: $\theta2=45$ degrees.

Further, a polarized direction of light incident onto the second polarizing film and an optical absorption axis of the second polarizing film may be aligned with each other upon display of a dark image.

Further, the LCD device may include another /1;2 wavelength film between the second polarizing film and the LC layer.

Further, the angle $\theta1$ between an optical axis of the LC layer in the transmissive area upon display of a dark image and a polarized direction of light incident onto the LC layer may be zero degree, and the LCD device may further includes a retardation film sandwiched between the another ½ wavelength film and the LC layer.

Further, the retardation film may have an optical characteristic satisfying the following relationship:

$-0.3 \leq (nx-nz)/(nx-ny) \leq 0.3$; or $(nx-nz)/(nx-ny)=1.0$, where nx, ny, nz and d are refractive index of a slow axis, refractive index of a fast axis, refractive index in a thickness direction and thickness of the retardation film, respectively, wherein the LC layer has a retardation substantially equal to $(nx-ny) \times d$; and the fast axis of the retardation film is parallel or perpendicular to the optical axis of the LC layer.

Further, the LC layer may include homogeneously-oriented liquid crystal.

Further, the first and second common signals may be inverted in synchrony with a synchronizing signal, and the first common signal may be substantially an inverted signal of the second common signal, and vice versa.

Further, each of the pixels may include a first pixel electrode in the transmissive area, a second pixel electrode in the reflective area, a first switch for supplying a data signal to the first pixel electrode, and a second switch for supplying the data signal to the second pixel electrode.

Further, the reflective area may include a reflection film maintained at an intermediate potential between a potential of the pix electrode and a potential of the first common electrode.

Further, the intermediate potential of the reflective film may be supplied by a capacitive coupling from the pixel electrode and the first common electrode.

Further, the intermediate potential of the reflective film may be provided by an intermediate-potential generator.

Further, the reflective film may have an opening right under the pixel electrode and the first common electrode.

Further, the reflective film may have a flat surface in a region right under the pixel electrode and the first common electrode, and a rough surface in the other region.

Further, each of said pixels may include a first pixel electrode in said transmissive area, a second pixel electrode in said reflective area, a first switching device for supplying a data signal to said first pixel electrode, and a second switch for supplying said data signal to said second pixel electrode.

Further, the transflective LCD device according to the present invention may include a first common electrode including a plurality of common electrodes connected in common and disposed in said reflective areas of a plurality of said pixels, and a second common electrode including a plurality of common electrodes connected in common and disposed in said transmissive areas of a plurality of said pixels.

Further, one of said first common electrode and said second common electrode may receive a common signal obtained by inversion of a common signal applied to the other of said first common electrode and said second common electrode.

Further, said first and second switching devices may be connected to a common data line, and driven by separate control lines.

Further, said first and second switching devices may be connected to a first data line and a second data line, respectively.

Further, one of said first and second common electrodes may be is applied with a first data signal output from a voltage converter for converting a second data signal applied to the other of said first and second common electrodes.

Further, said voltage converter may include a data memory for storing said second data signal, and a gray-scale level converter for converting a gray-scale level of said second data signal to output said first data signal.

Further, said voltage converter includes a look-up table for converting said gray-scale level. The look-up may table tabulate a maximum gray-scale level and a minimum gray-scale level in association. The look-up table may be configured by logic gates.

Further, the transflective LCD device may further include a first common electrode including a plurality of common electrodes connected in common and disposed in said reflective areas of a plurality of said pixels, and a second common electrode including a plurality of common electrodes connected in common and disposed in said transmissive areas of a plurality of said pixels.

Further, a potential to be written in said first and second common electrodes may be inverted at a timing of switching for writing data through said first switching device or said second switching device.

A method for driving the transflective LCD of the present invention may include the steps of: generating a first data signal and a second data signal having therebetween a specific potential relationship; and applying said first data signal and said second data signal to said reflective area and said transmissive area, respectively.

In the method of the present invention, said relationship between said first data signal and said second data signal may be such that said first data signal assumes a maximum gray-scale-level potential when is corresponding said second data signal assumes a minimum gray-scale-level potential.

The method of the present invention may further include the step of applying a first common electrode signal to a first common electrode disposed in said reflective areas of a plurality of said pixels and a second common electrode signal to a second common electrode disposed in said transmissive areas of a plurality of said pixels, said first common electrode signal having a potential different from a potential of said second common electrode signal.

The LCD device may include a first switching device for coupling a data line to said first pixel electrode and a second switching device for coupling said data line to said second pixel electrode, a first gate line for controlling said first switching device, a second gate line for controlling said second switching device, and said method may further include the steps of: turning ON said first and second switching devices in a time-division scheme, to apply a common data signal to said first and second pixel electrodes; applying a first common electrode signal to a common electrode during applying said common data signal to said first pixel electrode; and applying a second common electrode signal to said common electrode during applying said common data signal to said second pixel electrode, said first common electrode signal having a potential different from a potential of said second common electrode signal.

The LCD device may include a first switching device for coupling a first data line to said first pixel electrode, a second switching device for coupling a second data line to said second pixel electrode, and the method of the present invention may further include the step of: applying said first and second data signals to said first and second data lines, respectively.

In the method of the present invention, one of said first and second data signal may be supplied from outside of said LCD device, and the other of said first and second data signals has a gray-scale level converted from a grays-scale level of said one of said first and second data signals by using a look-up table.

In the method of the present invention, said look-up table may be such that similar γ-characteristics are obtained for both said reflective and transmissive areas.

The LCD device of the present invention may include a single common electrode for both said reflective area and said transmissive area of a plurality of said pixels, and the method further of the present invention may include the steps of: applying said single common electrode with a first common electrode signal at the timing of writing said first data signal; and applying said single common electrode signal with a second common electrode signal at the timing of writing said second data signal.

Although the present invention has been described with reference to the preferred embodiment, the transflective LCD device according to the present invention is not limited to the above embodiments, and a transflective LCD device obtained by making various modifications and changes in the configurations of the above-described embodiments will fall within the scope of the present invention.

What is claimed is:

1. A transflective liquid-crystal-display (LCD) device comprising:
   a liquid crystal (LC) layer defining a plurality of pixels each having a transmissive area and a reflective area, at least said transmissive area operating in a lateral-electric-field mode;
   first and second polarizing films sandwiching therebetween said LC layer, said first polarizing film being effective common to said transmissive area and said reflective area, said second polarizing film being effective only to said transmissive area;
   a ½ wavelength film sandwiched between said first polarizing film and said LC layer;
   another ½ wavelength film between said second polarizing film and said LC layer; and
   a single retardation film, said retardation film sandwiched between said another ½ wavelength film and said LC layer,
   wherein the relationship $(nx-nz)/(nx-ny)=0.3$ or $(nx-nz)/(nx-ny)=1.0$ and $(nx-ny)\times d$ is satisfied as per the retardation film,
   wherein, nx, ny, nz denote a refractive index in the direction of the slow axis of the retardation film, a refractive index in the direction of the fast axis of the retardation film, a refractive index in the thickness direction of the retardation film, respectively,
   wherein the value defined by $(nx-nz)/(nx-ny)=0.3$ or $(nx-nz)/(nx-ny)=1.0$ and $(nx-ny)\times d$ being set approximately equal to the retardation of the LC layer, where d is a thickness of the retardation film,
   wherein the wavelength dispersion of the birefringence of the retardation film is a reverse dispersion, and
   wherein each of said pixels includes a pixel electrode driven by a pixel data signal supplied in common to said transmissive area and said reflective area, a first common electrode driven by a first common signal supplied in common to said reflective areas of said plurality of pixels, and a second common electrode driven by a second common signal supplied in common to said transmissive areas of said plurality of pixels.

2. The transflective LCD device according to claim 1, wherein an angle θ1 between an optical axis of said LC layer in said transmissive area upon display of a dark image and a polarized direction of light incident onto said LC layer is zero degree.

3. A transflective liquid-crystal-display (LCD) device according to claim 1,
   wherein said LC layer includes homogeneously-oriented liquid crystal.

* * * * *